United States Patent
Lu et al.

(10) Patent No.: US 12,066,648 B2
(45) Date of Patent: Aug. 20, 2024

(54) APOCHROMATIC LIQUID CRYSTAL POLARIZATION HOLOGRAM DEVICE

(71) Applicant: Meta Platforms Technologies, LLC, Menlo Park, CA (US)

(72) Inventors: Lu Lu, Kirkland, WA (US); Hsien-Hui Cheng, Redmond, WA (US); Junren Wang, Kirkland, WA (US); Mengfei Wang, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 537 days.

(21) Appl. No.: 17/322,354

(22) Filed: May 17, 2021

(65) Prior Publication Data

US 2022/0365264 A1    Nov. 17, 2022

(51) Int. Cl.
    *G02B 5/30* (2006.01)
    *G02B 5/32* (2006.01)
    *G03H 1/02* (2006.01)

(52) U.S. Cl.
    CPC ............. *G02B 5/3083* (2013.01); *G02B 5/32* (2013.01); *G03H 1/0248* (2013.01); *G03H 2223/20* (2013.01)

(58) Field of Classification Search
    CPC .......... G02B 5/3083; G02B 5/32; G02B 5/30; G02B 27/01; G02B 27/0101; G02B 27/0103; G02B 27/017; G02B 27/0172; G02B 2027/0105; G02B 2027/0112; G02B 2027/0114; G02B 2027/0174; G02B 2027/0178; G02B 27/4261; G02B 27/4272; G03H 1/0248; G03H 1/024; G03H 1/26; G03H 2223/20; G03H 2001/2605–2615; G03H 2001/303
    See application file for complete search history.

(56) References Cited

U.S. PATENT DOCUMENTS

| 10,451,947 B1 | 10/2019 | Lu et al. |
| 10,705,401 B1 | 7/2020 | Lu et al. |
| 2004/0257628 A1* | 12/2004 | Mukawa ........... G02F 1/133504 359/15 |

(Continued)

OTHER PUBLICATIONS

International Search Report and Written Opinion for International Application No. PCT/US2022/029349, mailed Sep. 14, 2022, 9 pages.

*Primary Examiner* — Stephone B Allen
*Assistant Examiner* — Adam W Booher
(74) *Attorney, Agent, or Firm* — MILLBURN IP PLLC

(57) ABSTRACT

A device is provided. The device includes a first polarization hologram element configured to operate as a half-wave plate for a first light having a first wavelength, and as a full-wave plate for a second light having a second wavelength. The device also includes a second polarization hologram element stacked with the first polarization hologram, and configured to operate as the half-wave plate for the second light and as the full-wave plate for the first light. The first polarization hologram element is configured to forwardly diffract or transmit the first light depending on a handedness of the first light. The second polarization hologram element is configured to forwardly diffract or transmit the second light depending on a handedness of the second light.

8 Claims, 14 Drawing Sheets

(56) References Cited

U.S. PATENT DOCUMENTS

2018/0188631 A1   7/2018  Lu et al.
2018/0239177 A1*  8/2018  Oh ........................ G02B 6/0088
2019/0285890 A1   9/2019  Lam et al.
2020/0050031 A1*  2/2020  Lu .......................... G02F 1/0322

* cited by examiner

APOCHROMATIC LIQUID CRYSTAL POLARIZATION HOLOGRAM DEVICE

TECHNICAL FIELD

The present disclosure generally relates to devices and, more specifically, to an apochromatic liquid crystal polarization hologram device.

BACKGROUND

Liquid crystal polarization holograms ("LCPHs") refer to the intersection of liquid crystal devices and polarization holograms. Liquid crystal displays ("LCDs"), having grown to a trillion dollar industry over the past decades, are the most successful example of liquid crystal devices. The LCD industry has made tremendous investments to scale manufacturing, from the low end G2.5 manufacturing line to the high end G10.5+ to meet the market demands for displays. However, the LCD industry has recently faced competition from organic light-emitting diodes ("OLED"), e-paper and other emerging display technologies, that has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs have features such as small thickness (~1 um), light weight, compactness, large aperture, high efficiency, simple fabrication, etc. Thus, LCPHs have gained increasing interests in optical device and system applications, e.g., near-eye displays ("NEDs"), head-up displays ("HUDs"), head-mounted displays ("HMDs"), smart phones, laptops, televisions, or vehicles, etc. For example, LCPHs may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with an aspect of the present disclosure, a device is provided. The device includes a first polarization hologram element configured to operate as a half-wave plate for a first light having a first wavelength, and as a full-wave plate for a second light having a second wavelength. The device also includes a second polarization hologram element stacked with the first polarization hologram, and configured to operate as the half-wave plate for the second light and as the full-wave plate for the first light. The first polarization hologram element is configured to forwardly diffract or transmit the first light depending on a handedness of the first light. The second polarization hologram element is configured to forwardly diffract or transmit the second light depending on a handedness of the second light.

Consistent with another aspect of the present disclosure, a device is provided. The device includes a first polarization hologram element configured to forwardly diffract or transmit a first light having a first wavelength depending on a handedness of the first light, and forwardly diffract or transmit a second light having a second wavelength depending on a handedness of the second light. The device also includes a second polarization hologram element stacked with the first polarization hologram element, and configured to forwardly diffract or transmit the first light depending on the handedness of the first light, and forwardly diffract or transmit the second light depending on the handedness of the second light. The device further includes a color-selective waveplate disposed between the first and second polarization hologram elements, and configured to operate as a half-wave plate for the first light having the first wavelength and as a full-wave plate for the second light having the second wavelength.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
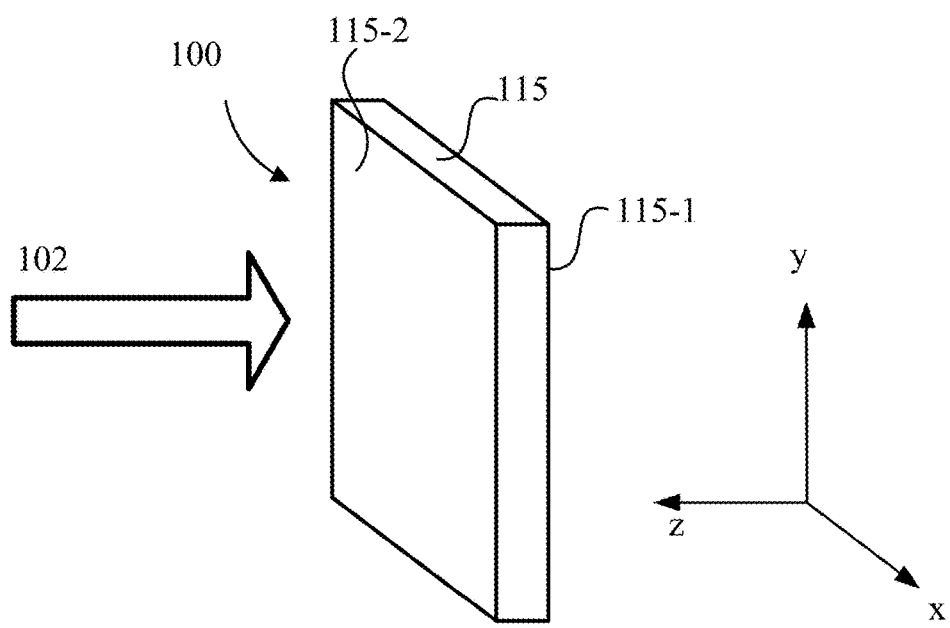
FIG. 1A schematically illustrates a three-dimensional ("3D") view of a liquid crystal polarization hologram ("LCPH") element, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise (or counter-clockwise) from the normal, the angle of the propagating direction may be defined as a positive angle, and when the propagating direction of the beam is counter-clockwise (or clockwise) from the normal, the angle of the propagating direction may be defined as a negative angle.

The wavelength bands, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 95%, 90%, 85%, 80%, etc., which may be determined based on specific application needs.

Among liquid crystal polarization hologram ("LCPH") elements, liquid crystal ("LC") based geometric phase ("GP") or Pancharatnam-Berry phase ("PBP") elements and polarization volume hologram ("PVH") elements have been extensively studied. A PBP element may modulate a circularly polarized light based on a phase profile provided through a geometric phase. A PBP element may split a linearly polarized light or an unpolarized light into two circularly polarized lights with opposite handednesses and symmetric deflecting directions. A PVH element may modulate a circularly polarized light based on Bragg diffraction. A PVH element may split a linearly polarized light or an unpolarized light into two circularly polarized lights with opposite handednesses or the same handedness. A PVH element may substantially diffract one circularly polarized component while substantially transmit the other circularly polarized component of a linearly polarized light or an unpolarized light. Orientations of LC molecules in the PBP element and the PVH element may exhibit rotations in three-dimensions, and may have similar in-plane orientational patterns.

PBP elements and PVH elements may be implemented as various optical devices, such as gratings, lenses, etc. Optical responses of PBP elements and PVH elements may have be wavelength dependent. For example, a diffraction angle of a PBP or PVH grating, and a focus distance of a PBP or PVH lens may vary with an incidence wavelength. For example, for a polychromatic incident light including blue, green, and red portions, a PBP or PVH grating may diffract blue, green, and red portions in different diffraction angles, and a PBP or PVH lens may focus blue, green, and red portions to different focal distances, resulting in chromatic aberrations. The chromatic aberrations may reduce the optical performance of a system that includes a PBP or PVH element receiving a polychromatic light.

In view of the limitations in conventional technologies, the present disclosure provides apochromatic, superfast (F #≤0.5 for a lens, beam deflection angle≥45° for a beam deflector), and highly efficient (≥95%) PVH devices or components. In some embodiments, the present disclosure provides a device. The device may include a first polarization hologram element configured to operate as a half-wave plate for a first light having a first wavelength, and as a full-wave plate for a second light having a second wavelength. The device may also include a second polarization hologram element stacked with the first polarization hologram, and configured to operate as the half-wave plate for the second light and as the full-wave plate for the first light. The first polarization hologram element may be configured to forwardly diffract or transmit the first light depending on a handedness of the first light. The second polarization hologram element is configured to forwardly diffract or transmit the second light depending on a handedness of the second light.

In some embodiments, the first polarization hologram element may be configured to transmit the second light independent of the handedness of the second light, and the second polarization hologram element may be configured to transmit the first light independent of the handedness of the first light. In some embodiments, the first polarization hologram element may be configured to forwardly diffract the first light in a predetermined diffraction angle when the handedness of the first light is a predetermined handedness. In some embodiments, the second polarization hologram element may be configured to forwardly diffract the second light in the predetermined diffraction angle when the handedness of the second light is the predetermined handedness.

In some embodiments, the first polarization hologram element may be configured to forwardly diffract to focus the first light to a predetermined focal point when the handedness of the first light is a predetermined handedness. In some embodiments, the second polarization hologram element is configured to forwardly diffract to focus the second light to the predetermined focal point when the handedness of the second light is the predetermined handedness.

In some embodiments, the first polarization hologram element and the second polarization hologram element may be transmissive polarization volume hologram ("T-PVH")

elements. In some embodiments, the T-PVH elements may include T-PVH gratings or T-PVH lenses. In some embodiments, the first wavelength and the second wavelength may correspond to a first color channel and a second color channel, respectively. In some embodiments, the device may also include at least one compensation plate stacked with at least one of the first polarization hologram element or the second polarization hologram element. In some embodiments, the at least one compensation plate may be a C-plate, an O-plate, or a biaxial plate. In some embodiments, the device may also include a third polarization hologram element configured to operate as the half-wave plate for a third light having a third wavelength, and as the full-wave plate for both of the first light and the second light. The third polarization hologram element may be configured to configured to forwardly diffract or transmit the third light depending on a handedness of the third light, and transmit the first light and the second light independent of the handedness of the first light and the handedness of the second light.

In some embodiments, the present disclosure provides a device. The device may include a first polarization hologram element configured to forwardly diffract or transmit a first light having a first wavelength depending on a handedness of the first light, and forwardly diffract or transmit a second light having a second wavelength depending on a handedness of the second light. The device may also include a second polarization hologram element stacked with the first polarization hologram element, and configured to forwardly diffract or transmit the first light depending on the handedness of the first light, and forwardly diffract or transmit the second light depending on the handedness of the second light. The device may further include a color-selective waveplate disposed between the first and second polarization hologram elements, and configured to operate as a half-wave plate for the first light having the first wavelength and as a full-wave plate for the second light having the second wavelength.

In some embodiments, the first and second polarization hologram elements may be configured to diffract the first light in clockwise direction and counter-clockwise direction, when the handedness of the first light is a predetermined handedness. In some embodiments, the first and second polarization hologram elements and the color-selective waveplate may be together configured to deflect the first and second lights having the predetermined handedness in a same deflecting angle. In some embodiments, the first and second polarization hologram elements may be configured to provide opposite optical powers to the first light when the handedness of the first light is a predetermined handedness. In some embodiments, the first and second polarization hologram elements and the color-selective waveplate may be together configured to focus the first and second lights having the predetermined handedness to a same focal point. In some embodiments, the first and second polarization hologram elements may be transmissive polarization volume hologram elements. In some embodiments, the device may also include a third polarization hologram element stacked with the first and second polarization hologram elements and the color-selective waveplate. The third polarization hologram element may be configured to forwardly diffract or transmit the first light depending on the handedness of the first light, forwardly diffract or transmit the second light depending on the handedness of the second light, and forwardly diffract or transmit a third light having a third wavelength depending on a handedness of the third light.

In some embodiments, the color-selective waveplate may be a first color-selective waveplate, and the device further includes a second color-selective waveplate disposed between the second polarization hologram element and the third polarization hologram element. The second color-selective waveplate may be configured to operate as the half-wave plate for the second light, and as the full-wave plate for both of the first light and the third light. In some embodiments, the device may also include at least one compensation plate stacked with the first and second polarization hologram elements and the color-selective waveplate. In some embodiments, the at least one compensation plate may be a C-plate, an O-plate, or a biaxial plate.

Figure 1B:
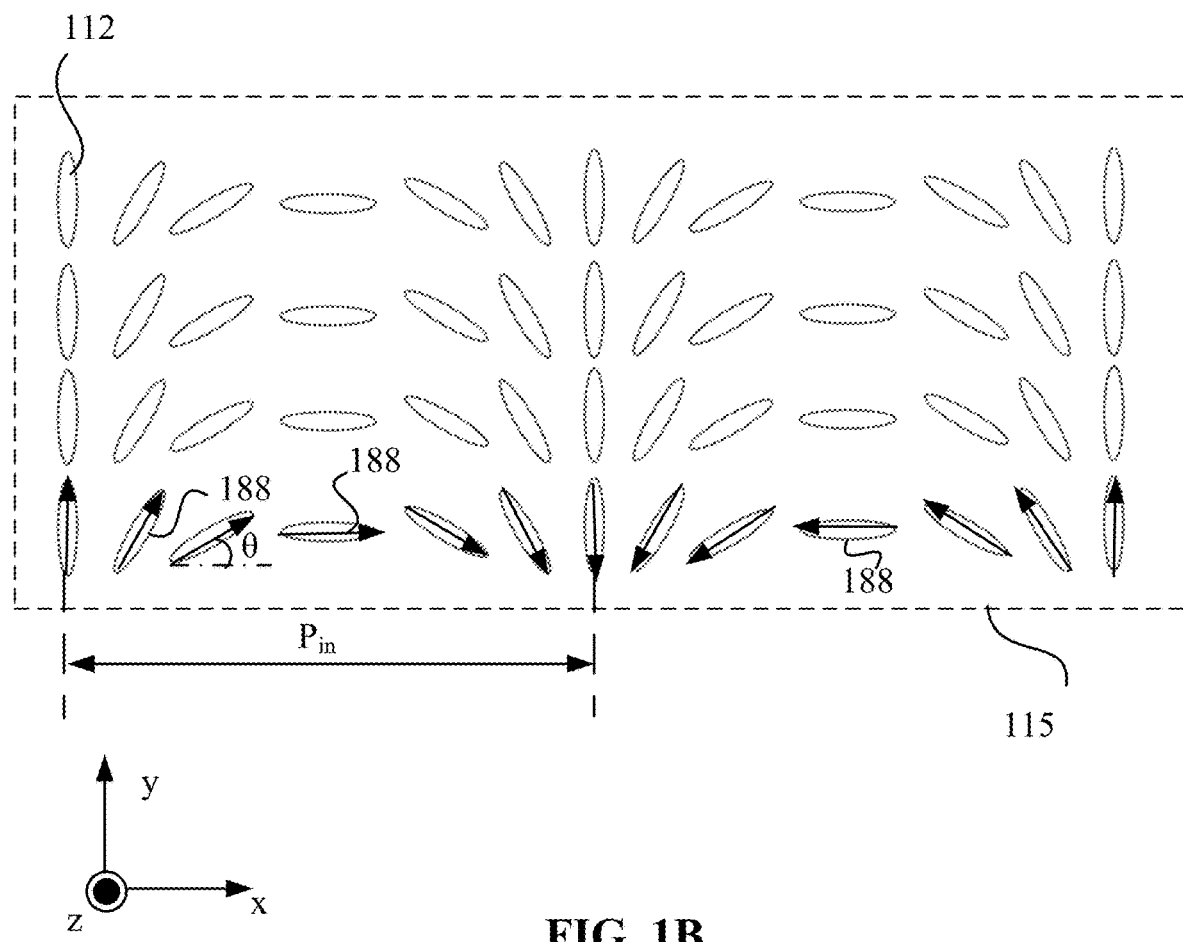
FIGS. 1B-1D schematically illustrate various views of a portion of the LCPH element shown in FIG. 1A, showing in-plane orientations of optically anisotropic molecules in the LCPH element, according to various embodiments of the present disclosure.
Figure 1C:
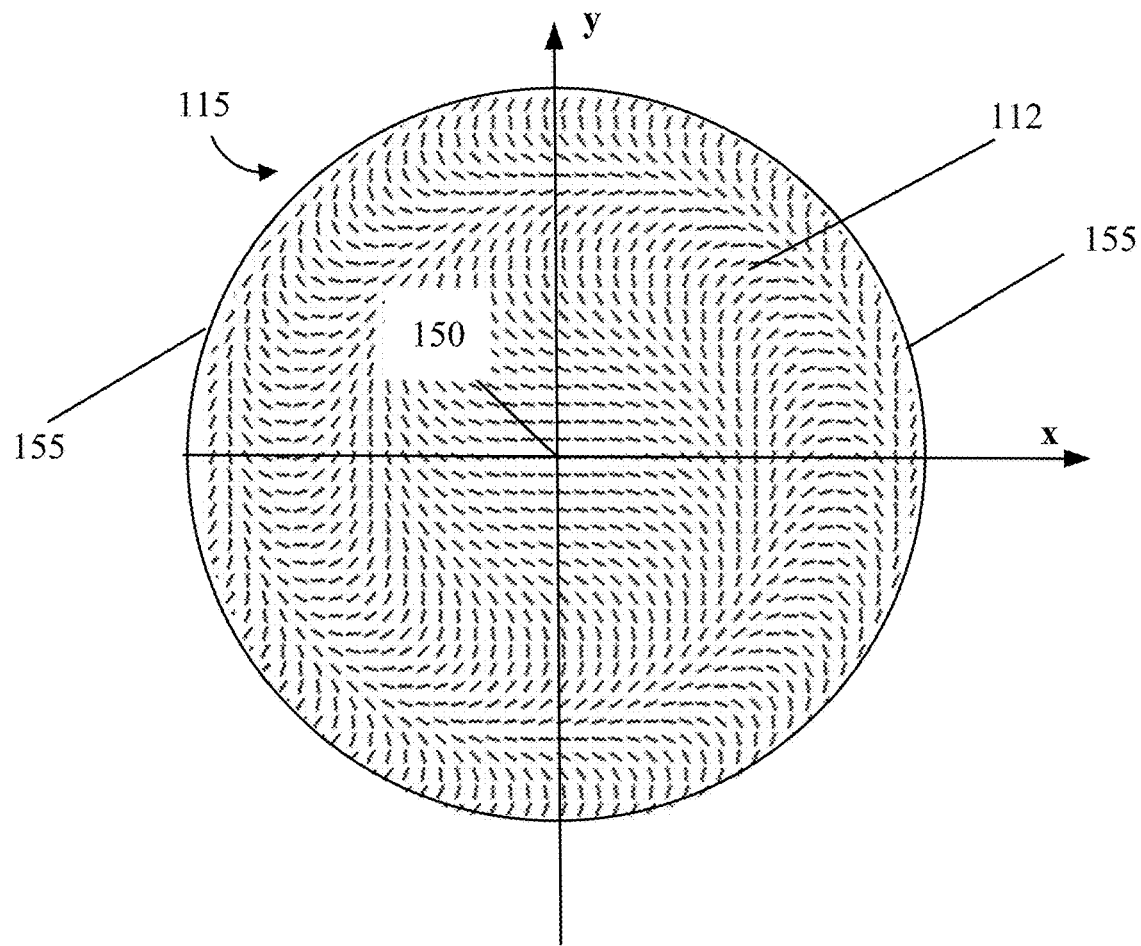
Figure 1D:
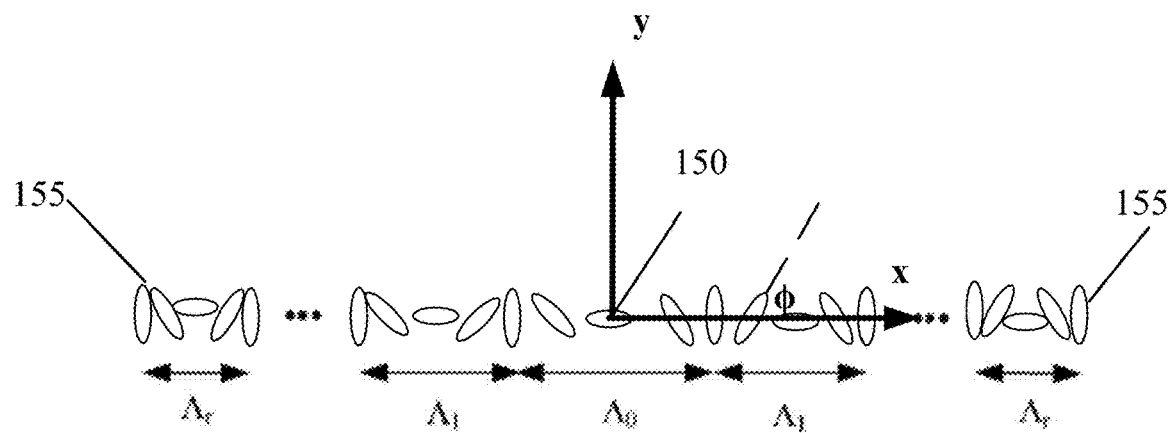

FIG. 1A illustrates a schematic three-dimensional ("3D") view of a liquid crystal polarization hologram ("LCPH") element 100 with a light 102 incident onto the LCPH element 100 along a −z-axis, according to an embodiment of the present disclosure. FIGS. 1B-1D schematically illustrate various views of a portion of the LCPH element 100 shown in FIG. 1A, showing in-plane orientations of optically anisotropic molecules in the LCPH element 100, according to various embodiments of the present disclosure. FIGS. 1E-1H schematically illustrate various views of a portion of the LCPH element 100 shown in FIG. 1A, showing out-of-plane orientations of optically anisotropic molecules in the LCPH element 100, according to various embodiments of the present disclosure.

As shown in FIG. 1A, although the LCPH element 100 is shown as a rectangular plate shape for illustrative purposes, the LCPH element 100 may have any suitable shape, such as a circular shape. In some embodiments, one or both surfaces along the light propagating path of the light 102 may have curved shapes. In some embodiments, the LCPH element 100 may be fabricated based on a birefringent medium, e.g., liquid crystal ("LC") materials, which may have an intrinsic orientational order of optically anisotropic molecules that may be locally controlled during the fabrication process. In some embodiments, the LCPH element 100 may be fabricated based on a photosensitive polymer, such as an amorphous polymer, an LC polymer, etc., which may generate an induced (e.g., photo-induced) optical anisotropy and/or an induced (e.g., photo-induced) optic axis orientation.

In some embodiments, the LCPH element 100 may include a birefringent medium (e.g., an LC material) in a form of a layer, which may be referred to as a birefringent medium layer (e.g., an LC layer) 115. The birefringent medium layer 115 may have a first surface 115-1 on one side and a second surface 115-2 on an opposite side. The first surface 115-1 and the second surface 115-2 may be surfaces along the light propagating path of the incident light 102. The birefringent medium layer 115 may include optically anisotropic molecules (e.g., LC molecules) configured with a three-dimensional ("3D") orientational pattern to provide a polarization selective optical response. In some embodiments, an optic axis of the LC material may be configured with a spatially varying orientation in at least one in-plane direction. For example, the optic axis of the LC material may periodically or non-periodically vary in at least one in-plane linear direction, in at least one in-plane radial direction, in at least one in-plane circumferential (e.g., azimuthal) direction, or a combination thereof. The LC molecules may be configured with an in-plane orientation pattern, in which the directors of the LC molecules may periodically or non-periodically vary in the at least one in-plane direction. In some embodiments, the optic axis of the LC material may also be configured with a spatially varying orientation in an out-of-plane direction. The directors of the LC molecules may also be configured with spatially varying orientations in an out-of-plane direction. For example, the optic axis of the LC material (or directors of the LC molecules) may twist in a helical fashion in the out-of-plane direction.

FIGS. 1B-1D schematically illustrate x-y sectional views of a portion of the LCPH element 100 shown in FIG. 1A, showing in-plane orientations of the optically anisotropic molecules 112 in the LCPH element 100, according to various embodiments of the present disclosure. For discussion purposes, rod-like LC molecules 112 are used as examples of the optically anisotropic molecules 112 of the birefringent medium layer 115. The rod-like LC molecule 112 may have a longitudinal axis (or an axis in the length direction) and a lateral axis (or an axis in the width direction). The longitudinal axis of the LC molecule 112 may be referred to as a director of the LC molecule 112 or an LC director. An orientation of the LC director may determine a local optic axis orientation or an orientation of the optic axis at a local point of the birefringent medium layer 115. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal. For illustrative purposes, the LC directors of the LC molecules 112 shown in FIGS. 1B-1D are presumed to be in the surface of the birefringent medium layer 115 or in a plane parallel with the surface with substantially small tilt angles with respect to the surface.

FIG. 1B schematically illustrate an x-y sectional view of a portion of the LCPH element 100, showing a periodic in-plane orientation pattern of the orientations of the LC directors (indicated by arrows 188 in FIG. 1B) of the LC molecules 112 located in close proximity to or at a surface (e.g., at least one of the first surface 115-1 or the second surface 115-2) of the birefringent medium layer 115. The orientations of the LC directors located in close proximity to or at the surface of the birefringent medium layer 115 may exhibit a periodic rotation in at least one in-plane direction (e.g., an x-axis direction). The periodically varying in-plane orientations of the LC directors form a pattern. The in-plane orientation pattern of the LC directors shown in FIG. 1B may also be referred to as a grating pattern. Accordingly, the LCPH element 100 may function as a polarization selective grating, e.g., a PVH grating, or a PBP grating, etc.

As shown in FIG. 1B, the LC molecules 112 located in close proximity to or at a surface (e.g., at least one of the first surface 115-1 or the second surface 115-2) of the birefringent medium layer 115 may be configured with orientations of LC directors continuously changing (e.g., rotating) in a predetermined direction (e.g., an x-axis direction) along the surface (or in a plane parallel with the surface). The continuous rotation of orientations of the LC directors may form a periodic rotation pattern with a uniform (e.g., same) in-plane pitch $P_{in}$. The predetermined direction may be any suitable direction along the surface (or in a plane parallel with the surface) of the birefringent medium layer 115. For illustrative purposes, FIG. 1B shows that the predetermined direction is the x-axis direction. The predetermined direction may be referred to as an in-plane direction, the pitch $P_{in}$ along the in-plane direction may be referred to as an in-plane pitch or a horizontal pitch. The pattern with the uniform (or same) in-plane pitch $P_{in}$ may be referred to as a periodic LC director in-plane orientation pattern. The in-plane pitch $P_{in}$ is defined as a distance along the in-plane direction (e.g., the x-axis direction) over which the orientations of the LC directors exhibit a rotation by a predetermined value (e.g., 180°). In other words, in a region substantially close to (including at) the surface of the birefringent medium layer 115, local optic axis orientations of the birefringent medium layer 115 may vary periodically in the in-plane direction (e.g., the x-axis direction) with a pattern having the uniform (or same) in-plane pitch $P_{in}$.

In addition, in regions located in close proximity to or at the surface (e.g., at least one of the first surface 115-1 or the second surface 115-2) of the birefringent medium layer 115, the orientations of the directors of the LC molecules 112 may exhibit a rotation in a predetermined rotation direction, e.g., a clockwise direction or a counter-clockwise direction. Accordingly, the rotation of the orientations of the directors of the LC molecules 112 in regions located in close proximity to or at the surface of the birefringent medium layer 115 may exhibit a handedness, e.g., right handedness or left handedness. In the embodiment shown in FIG. 1B, in regions located in close proximity to or at the surface of the birefringent medium layer 115, the orientations of the directors of the LC molecules 112 may exhibit a rotation in a clockwise direction. Accordingly, the rotation of the orientations of the directors of the LC molecules 112 in regions located in close proximity to or at the surface of the birefringent medium layer 115 may exhibit a left handedness.

Although not shown, in some embodiments, in regions located in close proximity to or at the surface (e.g., at least one of the first surface 115-1 or the second surface 115-2) of the birefringent medium layer 115, the orientations of the directors of the LC molecules 112 may exhibit a rotation in a counter-clockwise direction. Accordingly, the rotation of the orientations of the directors of the LC molecules 112 in regions located in close proximity to or at the surface of the birefringent medium layer 115 may exhibit a right handedness. Although not shown, in some embodiments, in regions located in close proximity to or at the surface of the birefringent medium layer 115, domains in which the orientations of the directors of the LC molecules 112 exhibit a rotation in a clockwise direction (referred to as domains $D_L$) and domains in which the orientations of the directors of the LC molecules 112 exhibit a rotation in a counter-clockwise direction (referred to as domains $D_R$) may be alternatingly arranged in at least one in-plane direction, e.g., in x-axis and y-axis directions.

FIG. 1C schematically illustrate an x-y sectional view of a portion of the LCPH element 100, showing a radially varying in-plane orientation pattern of the LC directors of the LC molecules 112 located in close proximity to or at a surface (e.g., at least one of the first surface 115-1 or the second surface 115-2) of the birefringent medium layer 115 shown in FIG. 1A. FIG. 1D illustrates a section of the in-plane orientation pattern taken along an x-axis in the birefringent medium layer 115 shown in FIG. 1C, according to an embodiment of the present disclosure. In a region in close proximity to or at a surface (e.g., at least one of the first surface 115-1 or the second surface 115-2) of the birefringent medium layer 115, the orientations of the optic axis of the birefringent medium layer 115 may exhibit a continuous rotation in at least two opposite in-plane directions from a center of the birefringent medium layer 115 to opposite peripheries of the birefringent medium layer 115 with a varying pitch. In some embodiments, the in-plane orientation pattern of the orientations of the LC directors shown in FIG. 1C may also be referred to as a lens pattern. Accordingly, the LCPH element 100 with the LC director orientations shown in FIG. 1C may function as a polarization selective lens, e.g., a PBP lens, or a PVH lens, etc.

As shown in FIG. 1C, the orientations of the LC molecules 112 located in close proximity to or at a surface (e.g., at least one of the first surface 115-1 or the second surface 115-2) of the birefringent medium layer 115 may be configured with an in-plane orientation pattern having a varying pitch in at least two opposite in-plane directions from a lens center 150 to opposite lens peripheries 155. For example, the orientations of the LC directors of LC molecules 112 located in close proximity to or at the surface of the birefringent medium layer 115 may exhibit a continuous rotation in at least two opposite in-plane directions (e.g., a plurality of opposite radial directions) from the lens center 150 to the opposite lens peripheries 155 with a varying pitch. The orientations of the LC directors from the lens center 150 to the opposite lens peripheries 155 may exhibit a rotation in a same rotation direction (e.g., clockwise, or counter-clockwise). A pitch Λ of the in-plane orientation pattern may be defined as a distance in the in-plane direction (e.g., a radial direction) over which the orientations of the LC directors (or azimuthal angles ϕ of the LC molecules 112) change by a predetermined angle (e.g., 180°) from a predetermined initial state.

As shown in FIG. 1D, according to the LC director field along the x-axis direction, the pitch Λ may be a function of the distance from the lens center 150. The pitch Λ may monotonically decrease from the lens center 150 to the lens peripheries 155 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., periphery 155) of the lens pattern, which may be the smallest. In some embodiments, the azimuthal angle ϕ of the LC molecule 112 may change in proportional to the distance from the lens center 150 to a local point of the birefringent medium layer 115 at which the LC molecule 112 is located.

The in-plane orientation patterns of the LC directors shown in FIGS. 1B-1D are for illustrative purposes. The LCPH element 100 may have any suitable in-plane orientation patterns of the LC directors. For illustrative purposes, FIGS. 1C and 1D show an in-plane orientation pattern of the LC directors when the LCPH element 100 is a PBP or PVH lens functioning as an on-axis spherical lens. In some embodiments, the LCPH element 100 may be a PBP or PVH lens functioning as an off-axis spherical lens, a cylindrical lens, an aspheric lens, or a freeform lens, etc.

Figure 1E:
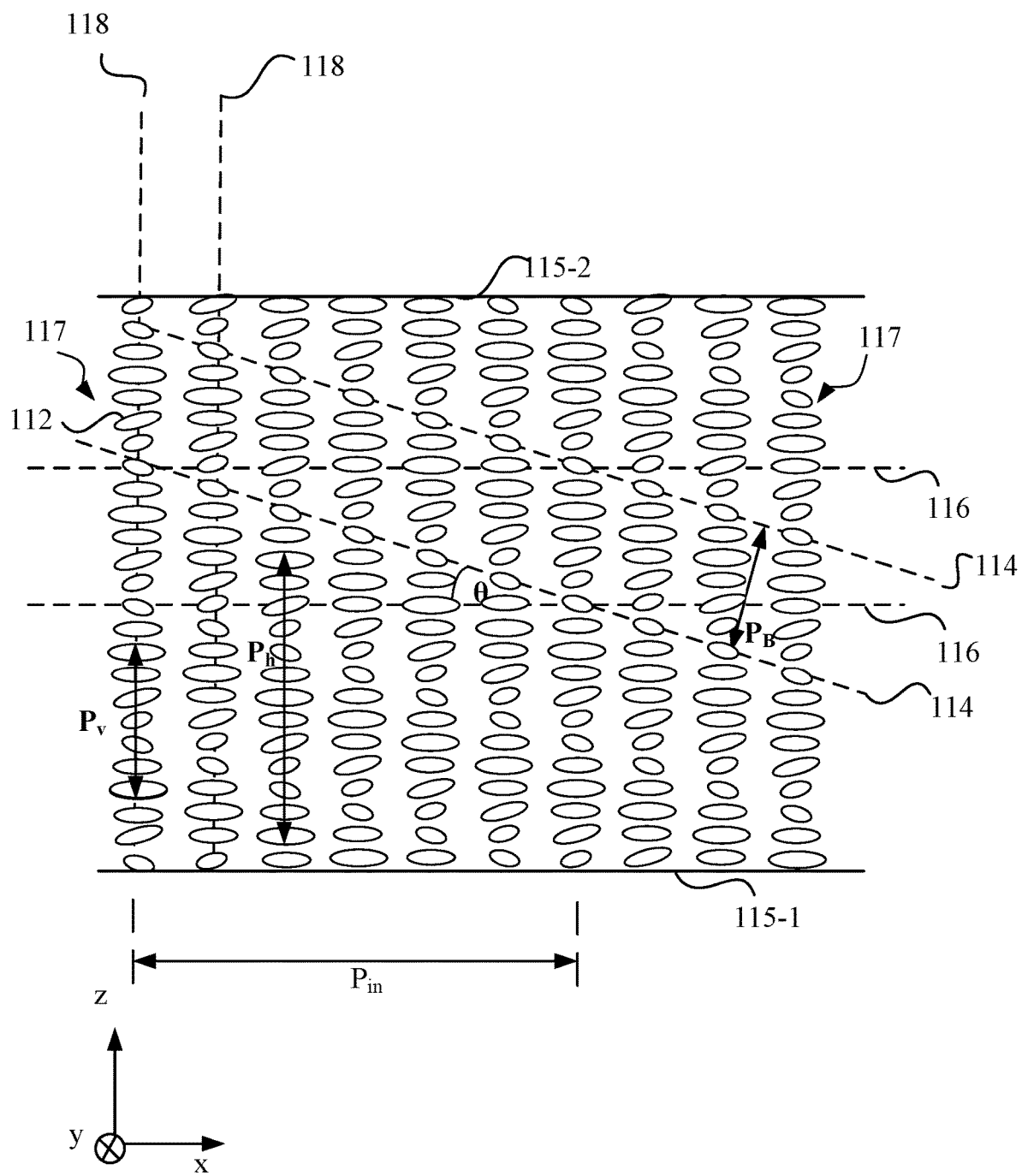
FIGS. 1E-1H schematically illustrate various views of a portion of the LCPH element shown in FIG. 1A, showing out-of-plane orientations of optically anisotropic molecules in the LCPH element, according to various embodiments of the present disclosure.

FIGS. 1E-1H schematically illustrate y-z sectional views of a portion of the LCPH element 100, showing out-of-plane orientations of the LC directors of the LC molecules 112 in the LCPH element 100, according to various embodiments of the present disclosure. For discussion purposes, FIGS. 1E-1H schematically illustrate out-of-plane (e.g., along z-axis direction) orientations of the LC directors of the LC molecules 112 when the in-plane (e.g., in a plane parallel to the x-y plane) orientation pattern is a periodic in-plane orientation pattern shown in FIG. 1B. As shown in FIG. 1E, within a volume of the birefringent medium layer 115, the LC molecules 112 may be arranged in a plurality of helical structures 117 with a plurality of helical axes 118 and a helical pitch $P_h$ along the helical axes. The azimuthal angles of the LC molecules 112 arranged along a single helical structure 117 may continuously vary around a helical axis 118 in a predetermined rotation direction, e.g., clockwise direction or counter-clockwise direction. In other words, the orientations of the LC directors of the LC molecules 112 arranged along a single helical structure 117 may exhibit a continuous rotation around the helical axis 118 in a predetermined rotation direction. That is, the azimuthal angles associated of the LC directors may exhibit a continuous change around the helical axis in the predetermined rotation direction. Accordingly, the helical structure 117 may exhibit a handedness, e.g., right handedness or left handedness. The helical pitch $P_h$ may be defined as a distance along the helical axis 118 over which the orientations of the LC directors exhibit a rotation around the helical axis 118 by 360°, or the azimuthal angles of the LC molecules vary by 360°.

In the embodiment shown in FIG. 1E, the helical axes 118 may be substantially perpendicular to the first surface 115-1 and/or the second surface 115-2 of the birefringent medium layer 115. In other words, the helical axes 118 of the helical structures 117 may be in a thickness direction (e.g., a z-axis direction) of the birefringent medium layer 115. That is, the LC molecules 112 may have substantially small tilt angles (including zero degree tilt angles), and the LC directors of the LC molecules 112 may be substantially orthogonal to the helical axis 118. The birefringent medium layer 115 may have a vertical pitch $P_v$, which may be defined as a distance along the thickness direction of the birefringent medium layer 115 over which the orientations of the LC directors of the LC molecules 112 exhibit a rotation around the helical axis 118 by 180° (or the azimuthal angles of the LC directors vary by 180°). In the embodiment shown in FIG. 1E, the vertical pitch $P_v$ may be half of the helical pitch $P_h$.

As shown in FIG. 1E, the LC molecules 112 from the plurality of helical structures 117 having a first same orientation (e.g., same tilt angle and azimuthal angle) may form a first series of parallel refractive index planes 114 periodically distributed within the volume of the birefringent medium layer 115. Although not labeled, the LC molecules 112 with a second same orientation (e.g., same tilt angle and azimuthal angle) different from the first same orientation may form a second series of parallel refractive index planes periodically distributed within the volume of the birefringent medium layer 115. Different series of parallel refractive index planes may be formed by the LC molecules 112 having different orientations. In the same series of parallel and periodically distributed refractive index planes 114, the LC molecules 112 may have the same orientation and the refractive index may be the same. Different series of refractive index planes 114 may correspond to different refractive indices. When the number of the refractive index planes 114 (or the thickness of the birefringent medium layer) increases to a sufficient value, Bragg diffraction may be established according to the principles of volume gratings. Thus, the periodically distributed refractive index planes 114 may also be referred to as Bragg planes 114. In some embodiments, as shown in FIG. 1E, the refractive index planes 114 may be slanted with respect to the first surface 115-1 or the second surface 115-2. In some embodiments, the refractive index planes 114 may be perpendicular to or parallel with the first surface 115-1 or the second surface 115-2. Within the birefringent medium layer 115, there may exist different series of Bragg planes. A distance (or a period) between adjacent Bragg planes 114 of the same series may be referred to as a Bragg period $P_B$. The different series of Bragg planes formed within the volume of the birefringent medium layer 115 may produce a varying refractive index profile that is periodically distributed in the volume of the birefringent medium layer 115. The birefringent medium layer 115 may diffract an input light satisfying a Bragg condition through Bragg diffraction.

As shown in FIG. 1E, the birefringent medium layer 115 may also include a plurality of LC molecule director planes (or molecule director planes) 116 arranged in parallel with one another within the volume of the birefringent medium layer 115. An LC molecule director plane (or an LC director plane) 116 may be a plane formed by or including the LC directors of the LC molecules 112. In the example shown in FIG. 1E, the LC directors in the LC director plane 116 have different orientations, i.e., the orientations of the LC directors vary in the x-axis direction. The Bragg plane 114 may form an angle θ with respect to the LC molecule director plane 116. In the embodiment shown in FIG. 1E, the angle θ may be an acute angle, e.g., 0°<θ<90°. The LCPH element 100 including the birefringent medium layer 115 shown in FIG. 1B may function as a T-PVH element, e.g., a T-PVH grating.

Figure 1F:
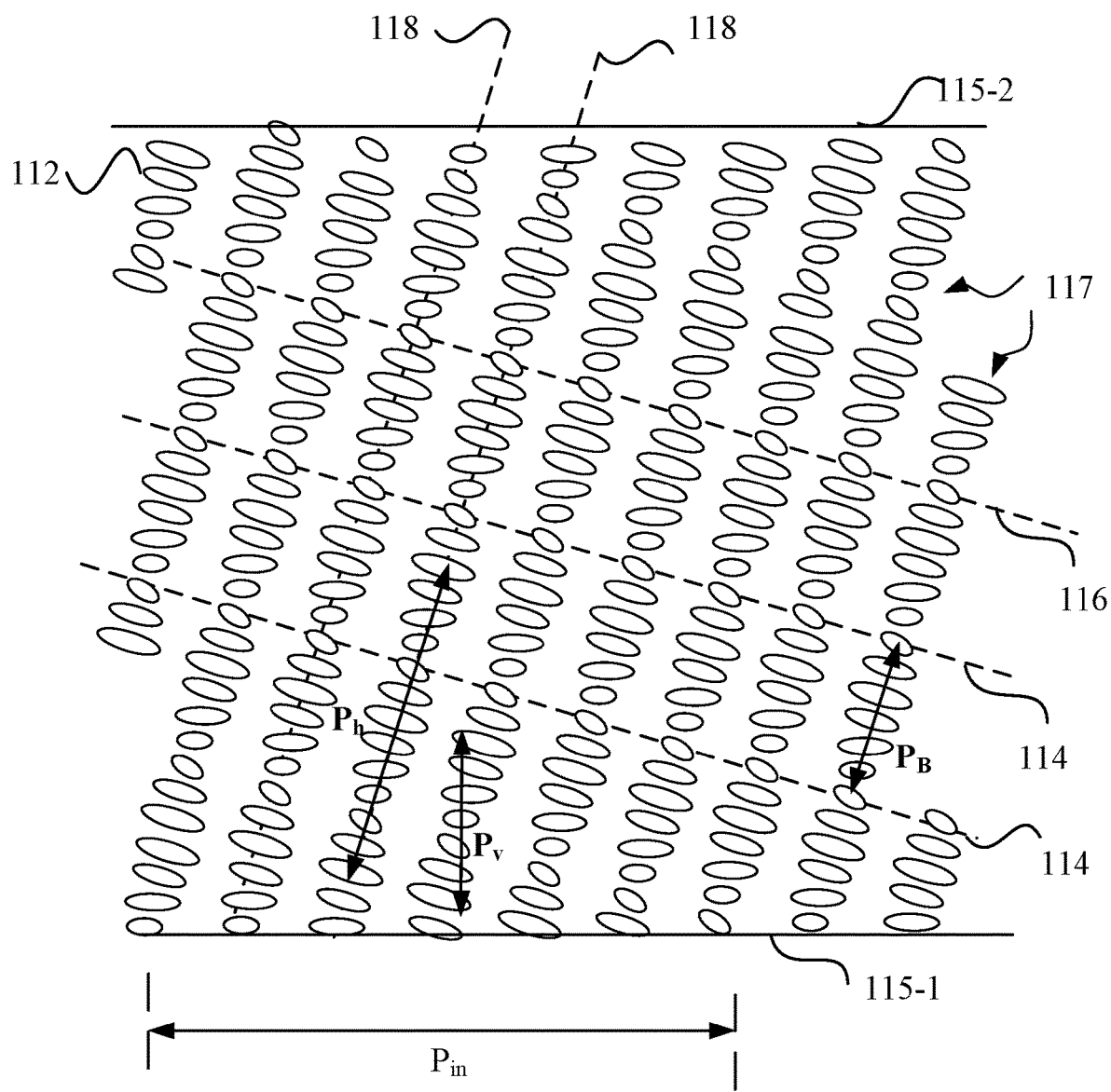

In the embodiment shown in FIG. 1F, the helical axes 118 of helical structures 117 may be tilted with respect to the first surface 115-1 and/or the second surface 115-2 of the birefringent medium layer 115 (or with respect to the thickness direction of the birefringent medium layer 115). For example, the helical axes 118 of the helical structures 117 may have an acute angle or obtuse angle with respect to the first surface 115-1 and/or the second surface 115-2 of the birefringent medium layer 115. In some embodiments, the LC directors of the LC molecule 112 may be substantially orthogonal to the helical axes 118 (i.e., the tilt angle may be substantially zero degree). In some embodiments, the LC directors of the LC molecule 112 may be tilted with respect to the helical axes 118 at an acute angle. The birefringent medium layer 115 may have a vertical periodicity (or pitch) $P_v$. In the embodiment shown in FIG. 1F, an angle θ (not shown) between the LC director plane 116 and the Bragg plane 114 may be substantially 0° or 180°. That is, the LC director plane 116 may be substantially parallel with the Bragg plane 114. In the example shown in FIG. 1F, the orientations of the directors in the molecule director plane 116 may be substantially the same. The LCPH element 100 including the birefringent medium layer 115 shown in FIG. 1F may function as a reflective PVH element, e.g., a reflective PVH grating.

Figure 1G:
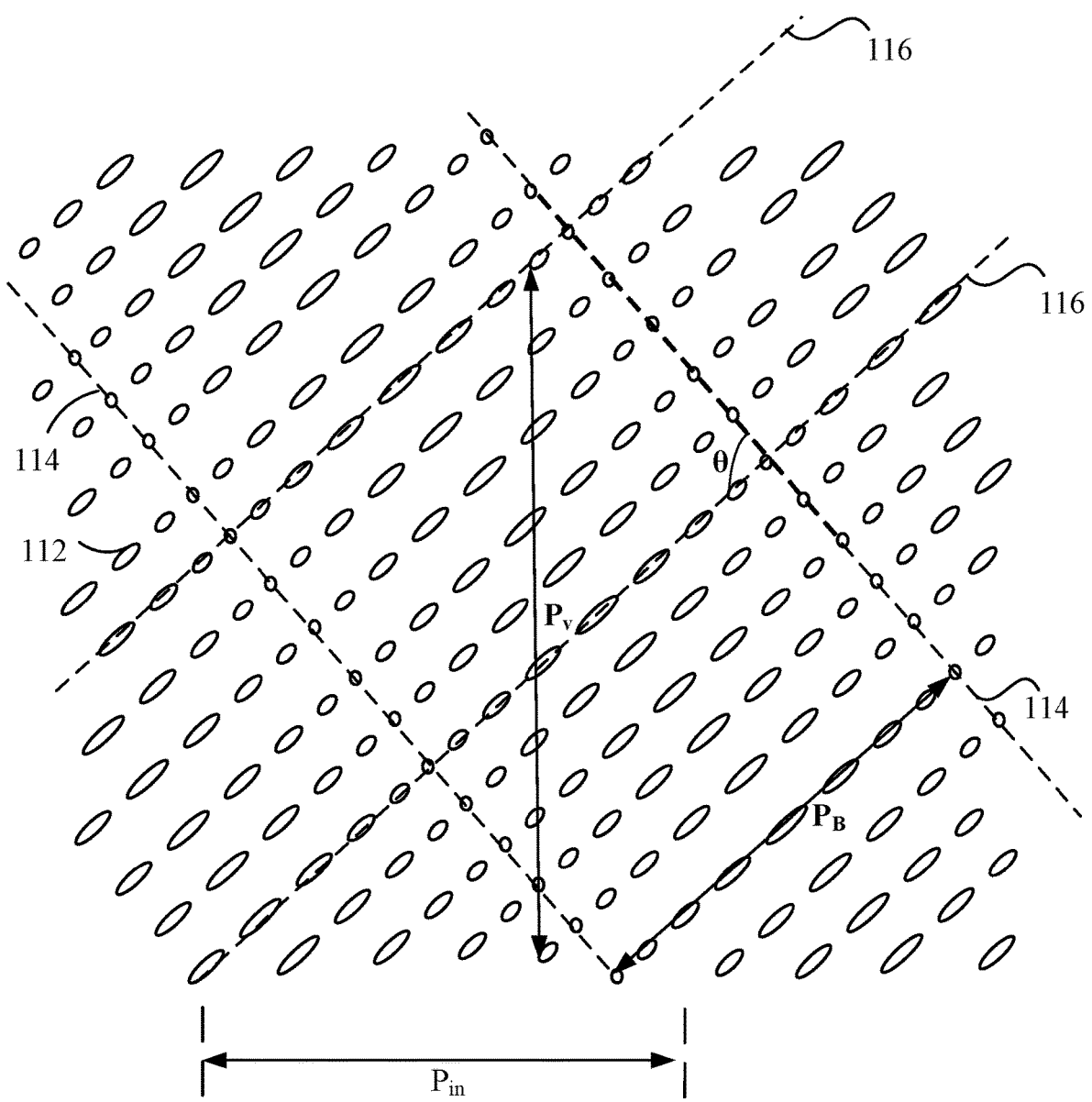

In the embodiment shown in FIG. 1G, the birefringent medium layer 115 (or the PVH including the birefringent medium layer 115) may also include a plurality of LC director planes 116 arranged in parallel within the volume of the birefringent medium layer 115. In the embodiment shown in FIG. 1F, an angle θ between the LC director plane 116 and the Bragg plane 114 may be a substantially right angle, e.g., θ=90°. That is, the LC director plane 116 may be substantially orthogonal to the Bragg plane 114. In the example shown in FIG. 1F, the LC directors in the LC director plane 116 may have different orientations. In some embodiments, the LCPH element 100 including the birefringent medium layer 115 shown in FIG. 1F may function as a T-PVH element, e.g., a T-PVH grating.

Figure 1H:
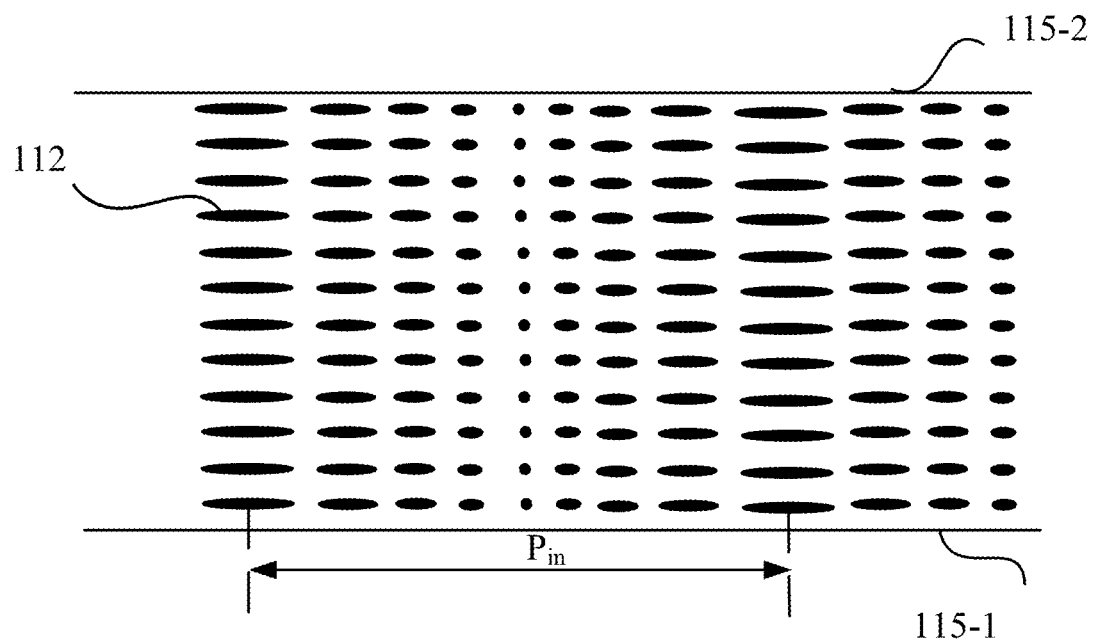
Figure 1H:
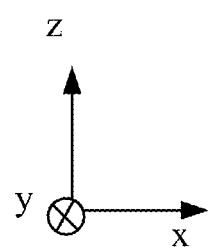

In the embodiment shown in FIG. 1H, in a volume of the birefringent medium layer 115, along the thickness direction (e.g., the z-axis direction) of the birefringent medium layer 115, the directors (or the azimuth angles) of the LC molecules 112 may remain in the same orientation (or same angle value) from the first surface 115-1 to the second surface 115-2 of the birefringent medium layer 115. In some embodiments, the thickness of the birefringent medium layer 115 may be configured as $d=\lambda/(2*\Delta n)$, where λ is a design wavelength, Δn is the birefringence of the LC material of the birefringent medium layer 115, and $\Delta n = n_e - n_o$, where $n_e$ and $n_o$ are the extraordinary and ordinary refractive indices of the LC material, respectively. In some embodiments, the LCPH element 100 including the birefringent medium layer 115 shown in FIG. 1F may function as a PBP element, e.g., a PBP grating.

FIG. 2A-3C schematically illustrate diagrams of various apochromatic PVH devices, according to various embodiments of the present disclosure. The disclosed apochromatic PVH device may include a plurality of T-PVH elements arranged in an optical series. In some embodiments, the plurality of T-PVH elements may be T-PVH gratings. The disclosed apochromatic PVH device may function as an apochromatic beam deflector configured to deflect (or steer) lights of two or more predetermined wavelength bands in a same deflecting (or steering) angle. In some embodiments, the plurality of T-PVH elements may be T-PVH lenses. The disclosed apochromatic PVH device may function as an apochromatic PVH lens configured to focus lights of two or more predetermined wavelength bands to a common focus. In some embodiments, a T-PVH lens may be considered as a T-PVH grating with an optical power.

In some embodiments, the two or more predetermined wavelength bands may include three predetermined wavelength bands. In some embodiments, the three predetermined wavelength bands may include visible wavelength bands corresponding to multiple, different colors. In some embodiments, the plurality of wavelength bands may include visible wavelength bands, infrared ("IR") wavelength bands, ultraviolet ("UV") wavelength bands, or a combination thereof. In some embodiments, the three predetermined wavelength bands may correspond to three predetermined wavelengths. In some embodiments, the three predetermined wavelengths may include visible wavelengths corresponding to multiple colors. In some embodiments, three predetermined wavelengths may include visible wavelengths, infrared wavelengths, ultraviolet wavelengths, or a combination thereof.

In the following descriptions, for illustrative purposes, three visible wavelength bands corresponding to multiple colors, for example, a first wavelength band corresponding to blue color (or color channel), a second wavelength band corresponding to green color (or color channel), and a third wavelength band corresponding to red color (or color channel) are used as an example of the three predetermined wavelengths. Apochromatic PVH devices that include three T-PVH elements and that operate for the visible spectral region are used as examples of the apochromatic PVH devices. In some embodiments, apochromatic PVH devices may be designed based on three wavelengths: $\lambda_R=620$ nm, $\lambda_G=530$ nm, and $\lambda_B=465$ nm. In such an embodiment, the red color channel may correspond to a wavelength of $\lambda_R=620$ nm, the green color channel may correspond to a wavelength of $\lambda_G=530$ nm, and the blue color channel corresponds to a wavelength of $\lambda_B=465$ nm. In some embodiments, apochromatic PVH devices that operate for any suitable spectral region (e.g., IR spectral region, UV spectral region) and/or that include any suitable number of PVH elements may also be configured, following the same design principles for the apochromatic PVH devices described below.

In some embodiments, an array of apochromatic PVH devices (e.g., apochromatic PVH microlens array) may be configured, following the same design principles for the apochromatic PVH devices described below. A stack of apochromatic PVH devices, e.g., a stack of apochromatic PVH beam deflectors configured to deflect a polychromatic light over different axes, may be configured, following the same design principles for the apochromatic PVH devices described below.

For discussion purposes, a predetermined wavelength band may be referred to as a predetermined color channel, a light having a predetermined wavelength band corresponding to a predetermined color (or color channel) may be referred to as a light of a predetermined color channel (or a light of predetermined color). A polychromatic light may include multiple portions of different color channels, and may be also referred to as a light of multiple color channels.

Figure 2A:
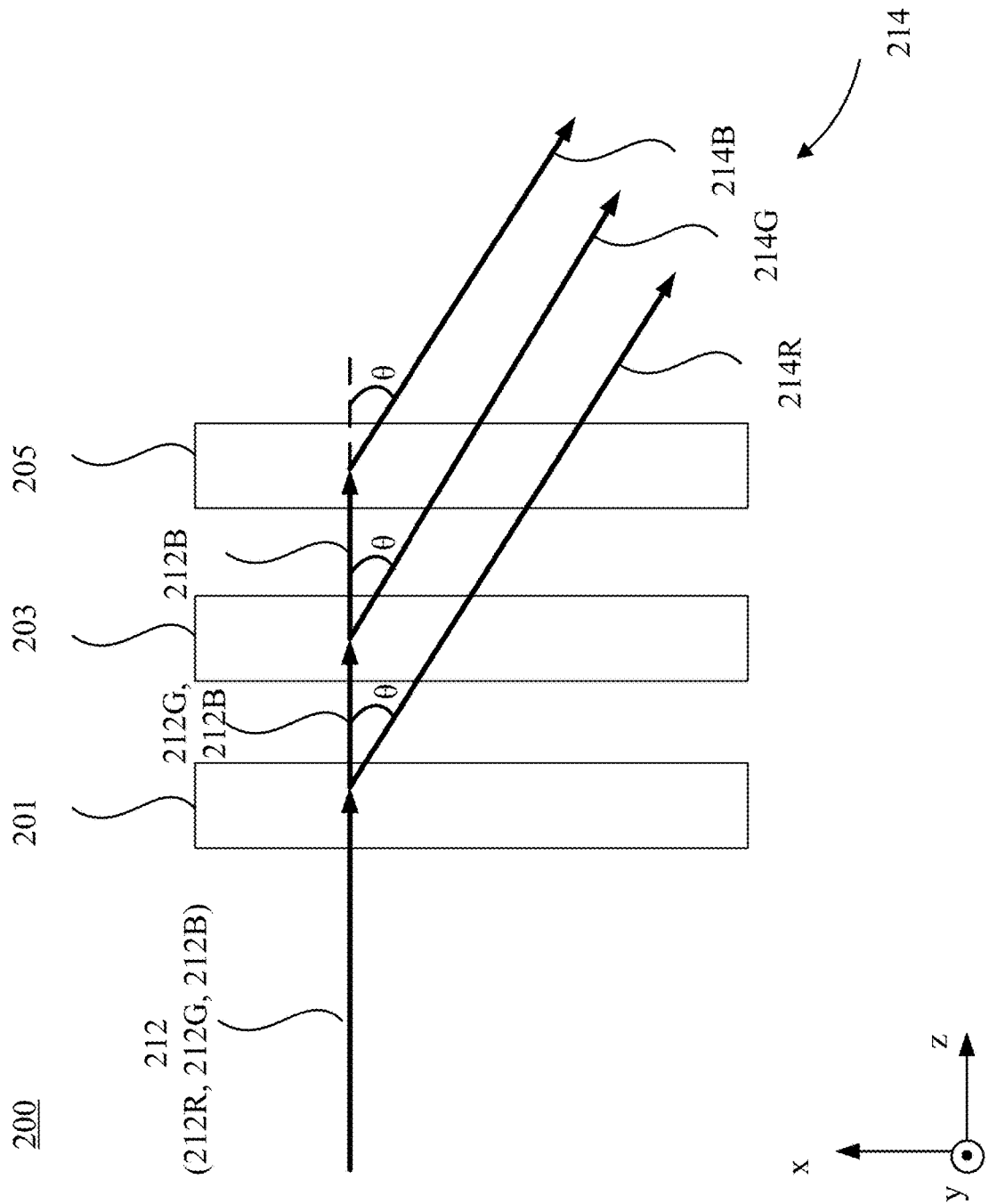
FIG. 2A schematically illustrates a diagram of an apochromatic polarization volume hologram ("PVH") device, according to an embodiment of the present disclosure.

FIG. 2A schematically illustrates an x-z sectional view of an apochromatic PVH device 200, according to an embodiment of the present disclosure. As shown in FIG. 2A, the PVH device 200 may include a plurality of (e.g., three) T-PVH elements 201, 203, and 205 arranged in an optical series. For discussion purposes, FIG. 2A shows that the PVH elements 201, 203, and 205 are spaced apart from one another with a gap. In some embodiments, the PVH elements 201, 203, and 205 may be directly coupled to one another without a gap therebetween. In some embodiments, the PVH elements 201, 203, and 205 may be directly coupled to one another without another optical element disposed therebetween. In some embodiments, the PVH elements 201, 203, and 205 may be indirectly coupled to one another with another optical element (e.g., a compensation film, and/or a color-selective waveplate, etc.) disposed therebetween. In some embodiments, the apochromatic PVH device 200 may function as a lens configured to focus lights of multiple (e.g., three) color channels (e.g., red, green, and blue color channels) to a single common focus. In some embodiments, the apochromatic PVH device 200 may function as a beam deflector configured to deflect (or steer) lights of the multiple color channels in a single common deflecting (or steering) angle.

In some embodiments, each of the PVH elements 201, 203, and 205 may be configured to operate as a half-wave plate for one of the three color channels, and operate as a full-wave plate (e.g., one-wave plate, two-wave plate, three-wave plate, etc.) for each of the two remaining color channels of the three color channels. For example, the PVH element 201 may operate as a half-wave plate for the red color channel and as a full-wave plate for the green and blue color channels. The PVH element 203 may operate as a half-wave plate for the green color channel and as a full-wave plate for the blue and red color channels. The PVH element 205 may operate as a half-wave plate for the blue color channel and as a full-wave plate for the red and green color channels. In some embodiments, the PVH element 201, 203, or 205 that operates as a half-wave plate for a predetermined color channel may provide a maximum diffraction efficiency for a light of the predetermined color channel. The PVH element 201, 203, or 205 that operates as a half-wave plate for a predetermined color channel may be configured to substantially forwardly diffract a circularly polarized light of the predetermined color channel, when the circularly polarized light has a predetermined handedness. The PVH element 201, 203, or 205 that operates as a half-wave plate for a predetermined color channel may be configured to substantially transmit, with negligible diffraction, the circularly polarized light when the circularly polarized light has a handedness that is opposite to the predetermined handedness. The PVH element 201, 203, or 205 that operates as the half-wave plate for the predetermined color channel may reverse the handedness of a diffracted light, and substantially maintain the handedness of a transmitted light.

In some embodiments, the PVH element 201, 203, or 205 that operates as a full-wave plate for a predetermined color channel may provide a minimum diffraction efficiency for a light of the predetermined color channel. The PVH element 201, 203, or 205 that operates as a full-wave plate for a predetermined color channel may be configured to substantially transmit, with negligible diffraction, a circularly polarized light of the predetermined color channel, independent of the handedness of the circularly polarized light. In some embodiments, the PVH element 201, 203, or 205 that operates as the full-wave plate for the predetermined color channel may substantially maintain at least one of a propagation direction, a wavefront, or a polarization of the circularly polarized light transmitted therethrough.

In some embodiments, the PVH elements 201, 203, and 205 may be configured with the same polarization selectivity. In other words, all of the PVH elements 201, 203, and 205 may be right-handed PVH elements or left-handed PVH elements. In some embodiments, a right-handed PVH element may be configured to substantially forwardly diffract a right-handed circularly polarized ("RHCP") light, and substantially transmit, with negligible diffraction, a left-handed circularly polarized ("LHCP") light. In some embodiments, a left-handed PVH element may be configured to substantially forwardly diffract an LHCP light, and substantially transmit, with negligible diffraction, an RHCP light. In other words, each of the PVH elements 201, 203, and 205 that operates as the half-wave plate for a respective predetermined color channel may be configured to substantially forwardly diffract a circularly polarized light having a same predetermined handedness and the respective predetermined color channel, and substantially transmit, with negligible diffraction, a circularly polarized light having a handedness that is opposite to the predetermined handedness and the respective predetermined color channel.

In some embodiments, each of the PVH elements 201, 203, and 205 that operates as the half-wave plate for the respective predetermined color channel may reverse the handedness of a diffracted light, and substantially maintain the handedness of a transmitted light. In other words, both of the diffracted light and the transmitted light of the PVH elements 201, 203, and 205 may have the second handedness.

Each of the PVH elements 201, 203, and 205 that operates as the full-wave plate for each of the remaining color channels (e.g., the color channels other than the predetermined color channel) may substantially transmit, with negligible diffraction, a circularly polarized light of each of the remaining color channels, independent of the handedness. In some embodiments, each of the PVH elements 201, 203, and 205 that operates as the full-wave plate for each of the remaining color channels may substantially maintain at least one (e.g., all) of a propagation direction, a wavefront, or a polarization of the circularly polarized light transmitted therethrough. In some embodiments, the PVH elements 201, 203, and 205 may be configured with different polarization selectivities.

For discussion purposes, in the embodiment shown in FIG. 2A, the PVH element 201 is configured to operate as a half-wave plate for a red color channel (e.g., the wavelength $\lambda_R$), and operate as a full-wave plate for a green color channel (e.g., the wavelength $\lambda_G$) and a blue color channel (e.g., the wavelength $\lambda_B$). The second PVH element 203 is configured to operate as a half-wave plate for the green color channel, and as a full-wave plate for the red color channel and the blue color channel. The third PVH element 205 is configured to operate as a half-wave plate for the blue color channel, and as a full-wave plate for the red color channel and the green color channel.

In the embodiment shown in FIG. 2A, the PVH elements 201, 203, and 205 may be T-PVH gratings, which are referred to as a first PVH grating 201, a second PVH grating 203, and a third PVH grating 205 for discussion purposes. The PVH device 200 may function as an apochromatic beam deflector (also referred to as 200 for discussion purposes). In some embodiments, the PVH gratings 201, 203, and 205 may be configured to have the same polarization selectivity. The PVH gratings 201, 203, and 205 that operate as half-wave plates for the respective predetermined color channels, may be configured to substantially forwardly diffract circularly polarized lights of the same predetermined handedness (e.g., left-handedness or right-handedness) and the respective predetermined color channels, in a substantially same diffraction angle θ (also referred to as a target or common diffraction angle θ). The PVH gratings 201, 203, and 205, which operate as full-wave plates for the remaining color channels, may be configured to substantially transmit, with negligible diffraction, circularly polarized lights of the remaining color channels, independent of the handedness.

In some embodiments, referring to FIG. 1B and FIG. 2A, the in-plane pitch $P_{in}$ of the PVH element 100 functioning as a PVH grating (e.g., PVH grating 201, 203, or 205) may determine the diffraction angle of a diffracted light. The diffraction angle of a $1^{st}$ order diffracted light may be calculated by the following grating equation:

$$\sin(\theta_{def}) \approx \lambda/(n*P_{in}),$$

where $\theta_{def}$ is the diffraction angle of the $1^{st}$ order diffracted light, $\lambda$ is an incidence wavelength, n is the refractive index of the PVH element 100, and $P_{in}$ is the in-plane pitch of the PVH element 100. In some embodiments, the refractive index n of the PVH element 100 may be the average refractive index of the birefringent material (e.g., an LC material) forming the PVH element 100, where $n=(n_e+n_o)/2$, $n_e$ and $n_o$ are the extraordinary and ordinary refractive indices of the birefringent material (e.g., an LC material), respectively.

In order to diffract lights of the three color channels in the same diffraction angle θ, the in-plane pitches and refractive indices of the PVH gratings 201, 203, and 205 may be configured to satisfy the following relationship:

$$\theta = \lambda_R/(n_1*P_{in-1}) = \lambda_G/(n_2*P_{in-2}) = \lambda_B/(n_3*P_{in-3}),$$

where $P_{in-1}$, $P_{in-2}$, and $P_{in-3}$ are the in-plane pitches of the first PVH grating 201, the second PVH 203, and the third PVH grating 205, respectively. Parameters $n_1$, $n_2$, and $n_3$ are the refractive indices of the first PVH grating 201, the second PVH grating 203, and the third PVH grating 205, respectively. In some embodiments, the refractive indices $n_1$, $n_2$, and $n_3$ of the first PVH grating 201, the second PVH grating 203, and the third PVH grating 205 may be configured to be substantially the same, e.g., $n_1=n_2=n_3=n$. To diffract lights of the three color channels in the same diffraction angle θ, the in-plane pitches $P_{in-1}$, $P_{in-2}$, and $P_{in-3}$ of the PVH gratings 201, 203, and 205 may be configured to satisfy the following relationship:

$$\theta/n = \lambda_R/P_{in-1} = \lambda_G/P_{in-2} = \lambda_B/P_{in-3},$$

where n is the same refractive index of the first PVH grating 201, the second PVH grating 203, and the third PVH grating 205. In other words, the in-plane pitches $P_{in-1}$, $P_{in-2}$, and $P_{in-3}$ of the PVH gratings 201, 203, and 205 may be configured to be different from one another. For example, the in-plane pitch $P_{in-1}$ of the first PVH grating 201 may be greater than the in-plane pitch $P_{in-2}$ of the second PVH grating 203 and the in-plane pitch $P_{in-3}$ of the third PVH grating 205. The in-plane pitch $P_{in-2}$ of the second PVH grating 203 may be greater than the in-plane pitch $P_{in-3}$ of the third PVH grating 205.

As shown in FIG. 2A, for discussion purposes, the PVH gratings 201, 203, and 205 may have the same polarization selectivity, e.g., being left-handed PVH gratings. For discussion purposes, an incident light 212 of the PVH device 200 may be a polychromatic light including a portion 212R of the red color channel (e.g., the wavelength $\lambda_R$) (referred to as a "red portion 212R"), a portion 212G of the green color channel (e.g., the wavelength $\lambda_G$) (referred to as a "green portion 212G"), and a portion 212B of the blue color channel (e.g., the wavelength $\lambda_B$) (referred to as a "blue portion 212B"). For discussion purposes, the light 212 may be an LHCP, polychromatic light. For discussion purposes, the light 212 may be substantially normally incident onto the PVH device 200. In other words, the light 212 may be a substantially on-axis or axis-parallel incident light of the PVH device 200. For illustrative purposes, the light 212 is shown as being incident onto the PVH device 200 from a side of the first PVH grating 201. In some embodiments, the light 212 may be incident onto the PVH device 200 from a side of the third PVH grating 205.

The first PVH grating 201 that operates as a half-wave plate for the red color channel (e.g., the wavelength $\lambda_R$) may substantially forwardly diffract the red portion 212R of the LHCP light 212 as an RHCP red light 214R in the target diffraction angle θ (with respect to a normal of a light outputting surface of the first PVH grating 201). The first PVH grating 201 that operates as a full-wave plate for each of the green color channel (e.g., the wavelength $\lambda_G$) and the blue color channel (e.g., the wavelength $\lambda_B$) may substantially transmit, with negligible diffraction, the green portion 212G and the blue portion 212B of the LHCP light 212 toward the second PVH grating 203, respectively. In some embodiments, the first PVH grating 201 may substantially maintain at least one (e.g., all) of the propagation directions, the wavefronts, or the polarizations of the green portion 212G and the blue portion 212B of the LHCP light 212.

The second PVH grating 203 that operates as a half-wave plate for the green color channel (e.g., the wavelength $\lambda_G$) may substantially forwardly diffract the green portion 212G of the LHCP light 212 as an RHCP green light 214G in the target diffraction angle θ (with respect to a normal of a light outputting surface of the second PVH grating 203). The second PVH grating 203 that operates a full-wave plate for the red color channel (e.g., the wavelength $\lambda_R$) may substantially transmit, with negligible diffraction, the RHCP red light 214R toward the third PVH grating 205. The second PVH grating 203 that operates a full-wave plate for the blue color channel (e.g., the wavelength $\lambda_B$) may substantially transmit, with negligible diffraction, the blue portion 212B of the LHCP light 212 toward the third PVH grating 205. In some embodiments, the second PVH grating 203 may substantially maintain at least one (e.g., all) of the propagation directions, the wavefronts, or the polarizations of the RHCP red light 214R and the blue portion 212B of the LHCP light 212.

The third PVH grating 205 that operates as a half-wave plate for the blue color channel (e.g., the wavelength $\lambda_B$) may substantially forwardly diffract the blue portion 212B of the LHCP light 212 as an RHCP blue light 214B in the target diffraction angle θ (with respect to a normal of a light outputting surface of the third PVH grating 205). The third PVH grating 205 that operates as a full-wave plate for the red color channel (e.g., the wavelength $\lambda_R$) may substantially transmit, with negligible diffraction, the RHCP red light 214R. The third PVH grating 205 that operates as a full-wave plate for the green color channel (e.g., the wavelength $\lambda_G$) may substantially transmit, with negligible diffraction, the RHCP green light 214G. In some embodiments, the third PVH grating 205 may substantially maintain at least one (e.g., all) of the propagation directions, the wavefronts, or the polarizations of the RHCP red light 214R and the RHCP green light 214G.

Thus, the PVH device 200 may respectively diffract the red portion 212R, the green portion 212G, and the blue portion 212B of the LHCP incident light 212 as the RHCP red light 214R, the RHCP green light 214G, and the RHCP blue light 214B having the common diffraction angle θ. In other words, the PVH device 200 may diffract the red portion 212R, the green portion 212G, and the blue portion 212B of the LHCP light 212 in the common diffraction angle θ. At an output side of the PVH device 200, the RHCP red light 214R, the RHCP green light 214G, and the RHCP blue light 214B may be combined to be visually observed as a polychromatic RHCP light 214 that is steered (or deflected) by the common steering angle (or deflecting angle) θ (with respect to a normal of a surface of the PVH device 200).

Figure 2B:
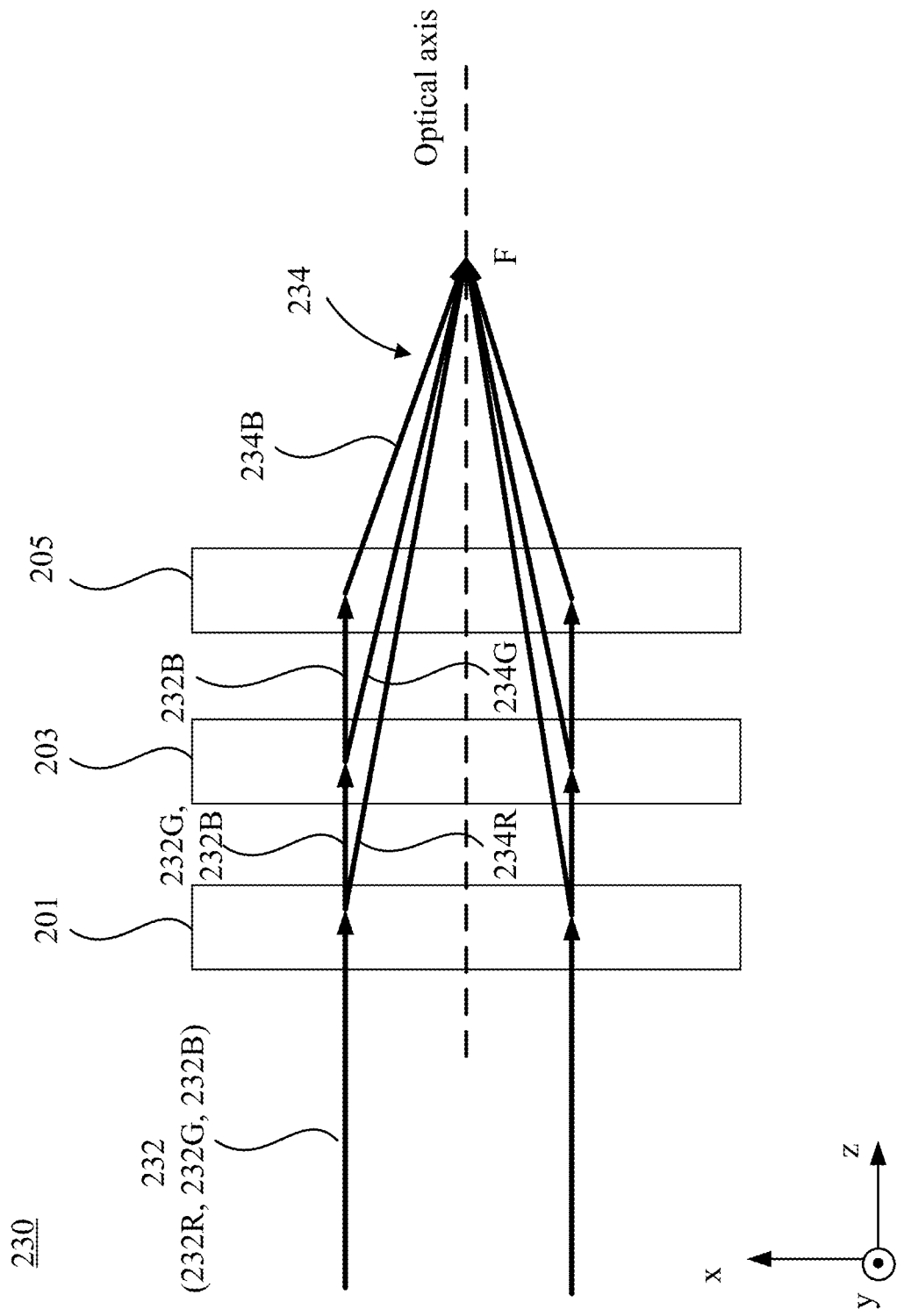
FIG. 2B schematically illustrates a diagram of an apochromatic PVH device, according to an embodiment of the present disclosure.

FIG. 2B schematically illustrates an x-z sectional view of an apochromatic PVH device 230, according to an embodiment of the present disclosure. The apochromatic PVH device 230 may include elements that are the same as or similar to those included in the apochromatic PVH device 200 shown in FIG. 2A. Descriptions of the same or similar elements may refer to the above descriptions rendered in connection with FIG. 2A. For example, as shown in FIG. 2B, the apochromatic PVH device 230 may include a plurality of (e.g., three) PVH elements 201, 203, and 205 arranged in an optical series. In the embodiment shown in FIG. 2B, the PVH elements 201, 203, and 205 may be T-PVH lenses, which are also referred to as a first PVH lens 201, a second PVH lens 203, and a third PVH lens 205 for discussion purposes. The apochromatic PVH device 230 may function as an apochromatic PVH lens (also referred to as 230 for discussion purposes). In some embodiments, the PVH lenses 201, 203, and 205 may have the same polarization selectivity, e.g., may be all left-handed PVH lenses or right-handed PVH lenses. The PVH lenses 201, 203, and 205 that operate as half-wave plates for the respective predetermined color channels, may be configured to substantially focus, via forward diffraction, circularly polarized lights having the same predetermined handedness (e.g., left-handedness or right-handedness) and the respective predetermined wavelengths to a substantially same point F (also referred to as a target or common focal point F). The PVH lenses 201, 203, and 205, which operate as full-wave plates for the remaining color channels, may be configured to substantially transmit, with negligible diffraction, circularly polarized lights having the remaining color channels, independent of the handedness of the lights.

In some embodiments, referring to FIGS. 1C-1D and FIG. 2B, the focal length of the PVH element 100 functioning as a PVH lens (e.g., the PVH lens 201, 203, or 205) may be, in part, determined by the pitch $\Lambda$ of the in-plane orientation pattern of the PVH element 100 and the aperture size of an aperture of the PVH element 100. The focal length of the PVH element 100 functioning as a PVH lens may be calculated by the following lens equation:

$$f=r/(\tan(\sin^{-1}(\lambda*\Lambda))),$$

where f is the focal length of the PVH element 100, r is the radius of the aperture of the PVH element 100, λ is an incidence wavelength, Λ is the pitch of the in-plane orientation pattern at the lens periphery (referred to as the in-plane pitch at the lens periphery for discussion purposes) of the PVH element 100. In some embodiments, the radius r of the aperture of the PVH element 100 may be a distance from the lens center 150 to the lens periphery 155 shown in FIGS. 1C and 1D.

In order to focus, via forward diffraction, lights of the three color channels to the common focal point F, the radii r of the apertures and the in-plane pitches Λ at the lens peripheries of the PVH lenses 201, 203, and 205 may be configured to satisfy the following relationship:

$$f=r_1/(\tan(\sin^{-1}(\lambda_R*\Lambda_1)))=r_2/(\tan(\sin^{-1}(\lambda_G*\Lambda_2)))=r_3/(\tan(\sin^{-1}(\lambda_B*\Lambda_3))),$$

where $r_1$, $r_2$, and $r_3$ are the radii of the apertures of the first PVH lens 201, the second PVH lens 203, and the third PVH lens 205, respectively. $\Lambda_1$, $\Lambda_2$, and $\Lambda_3$ are the in-plane pitches at the lens peripheries of the first PVH lens 201, the second PVH lens 203, and the third PVH lens 205, respectively. f is a design focal length of the apochromatic PVH device 230. In some embodiments, the radii $r_1$, $r_2$, and $r_3$ of the apertures of the first PVH lens 201, the second PVH lens 203, and the third PVH lens 205 may be configured to be substantially the same. To focus the lights of the three wavelengths to the common focal point F, the in-plane pitches $\Lambda_1$, $\Lambda_2$, and $\Lambda_3$ at the lens peripheries of the PVH lenses 201, 203, and 205 may be configured to satisfy the following relationship:

$$r/f=\tan(\sin^{-1}(\lambda_R*\Lambda_1))=\tan(\sin^{-1}(\lambda_G*\Lambda_2))=\tan(\sin^{-1}(\lambda_B*\Lambda_3)),$$

where r is the radius of the aperture of the first PVH lens 201, the second PVH lens 203, and the third PVH lens 205.

In other words, the in-plane pitches Λ at the lens peripheries of the first PVH lens 201, the second PVH lens 203, and the third PVH lens 205 may be configured to be different from one another. For example, the in-plane pitch $\Lambda_1$ at the lens periphery of the first PVH lens 201 may be greater than the in-plane pitch $\Lambda_2$ at the lens periphery of the second PVH lens 203 and the in-plane pitch $\Lambda_3$ at the lens periphery of the third PVH lens 205. The in-plane pitch $\Lambda_2$ at the lens periphery of the second PVH lens 203 may be greater than the in-plane pitch $\Lambda_3$ at the lens periphery of the third PVH lens 205.

As shown in FIG. 2B, for discussion purposes, the PVH lenses 201, 203, and 205 may be left-handed PVH lenses. For discussion purposes, an incident light 232 of the PVH device 230 may be a polychromatic light including a portion 232R of red color channel (e.g., the wavelength $\lambda_R$) (referred to as a red portion 232R), a portion 232G of green color channel (e.g., the wavelength $\lambda_G$) (referred to as a green portion 232G), and a portion 232B of blue color channel (e.g., the wavelength $\lambda_B$) (referred to as a blue portion 232B). For discussion purposes, the light 232 may be an LHCP polychromatic light. For discussion purposes, the light 232 may be substantially normally incident onto the PVH device 230. In other words, the light 232 may be a substantially on-axis or axis-parallel incident light of the PVH device 230. For illustrative purposes, the light 232 is shown as being incident onto the PVH device 230 from a side of the first PVH lens 201. In some embodiments, the light 232 may be incident onto the PVH device 230 from a side of the third PVH lens 205.

In the embodiment shown in FIG. 2B, the first PVH lens 201 that operates as a half-wave plate for the red color channel (e.g., the wavelength $\lambda_R$) may substantially forwardly diffract the red portion 232R of the LHCP light 232 as an RHCP red light 234R that is focused to a target focal point F. In other words, the first PVH lens 201 may focus, via forward diffraction, the red portion 232R of the LHCP light 232 to the target focal point F. The first PVH lens 201 that operates as a full-wave plate for each of the green color channel (e.g., the wavelength $\lambda_G$) and the blue color channel (e.g., the wavelength $\lambda_B$) may substantially transmit, with negligible diffraction, the green portion 232G and the blue portion 232B of the LHCP light 232. In some embodiments, the first PVH lens 201 may substantially maintain at least one (e.g., all) of the prorogation directions, the wavefronts, or the polarization of the green portion 232G and the blue portion 232B of the LHCP light 232.

The second PVH lens 203 that operates as a half-wave plate for the green color channel (e.g., the wavelength $\lambda_G$) may substantially forwardly diffract the green portion 232G of the LHCP light 232 as an RHCP green light 234G that is focused to the target focal point F. In other words, the second PVH lens 203 may focus, via forward diffraction, the green portion 232G of the LHCP light 232 to the target focal point F. The second PVH lens 203 that operates a full-wave plate for the red color channel (e.g., the wavelength $\lambda_R$) may substantially transmit, with negligible diffraction, the RHCP red light 234R toward the third PVH lens 205. The second PVH lens 203 that operates a full-wave plate for the blue color channel (e.g., the wavelength $\lambda_B$) may substantially transmit, with negligible diffraction, the blue portion 232B of the LHCP light 232 toward the third PVH lens 205. In some embodiments, the second PVH lens 203 may substantially maintain at least one (e.g., all) of the prorogation directions, the wavefronts, or the polarization of the RHCP red light 234R, and the blue portion 232B of the LHCP light 232.

The third PVH lens 205 that operates as a half-wave plate for the blue color channel (e.g., the wavelength $\lambda_B$) may substantially forwardly diffract the blue portion 232B of the LHCP light 232 as an RHCP green light 234B that is focused to the target focal point F. The third PVH lens 205 that operates as a full-wave plate for the red color channel (e.g., the wavelength $\lambda_R$) may substantially transmit, with negligible diffraction, the RHCP red light 234R. The third PVH lens 205 that operates as a full-wave plate for the green color channel (e.g., the wavelength $\lambda_G$) may substantially transmit, with negligible diffraction, the RHCP green light 234G. In some embodiments, the third PVH lens 205 may substantially maintain at least one (e.g., all) of the prorogation directions, the wavefronts, or the polarization of the RHCP red light 234R and the RHCP green light 234G.

Thus, the PVH device 230 may respectively diffract the red portion 232R, the green portion 232G, and the blue portion 232B of the LHCP light 232 as the RHCP red light 234R, the RHCP green light 234G, and the RHCP blue light 234B that are focused to the common focal point F. In other words, the PVH device 230 may focus the LHCP light 232 to the common focal point F. At an output side of the PVH device 230, the RHCP red light 234R, the RHCP green light 234G, and the RHCP blue light 234B may form a polychromatic RHCP light 234 that is focused to the common focal point F.

Figure 2C:
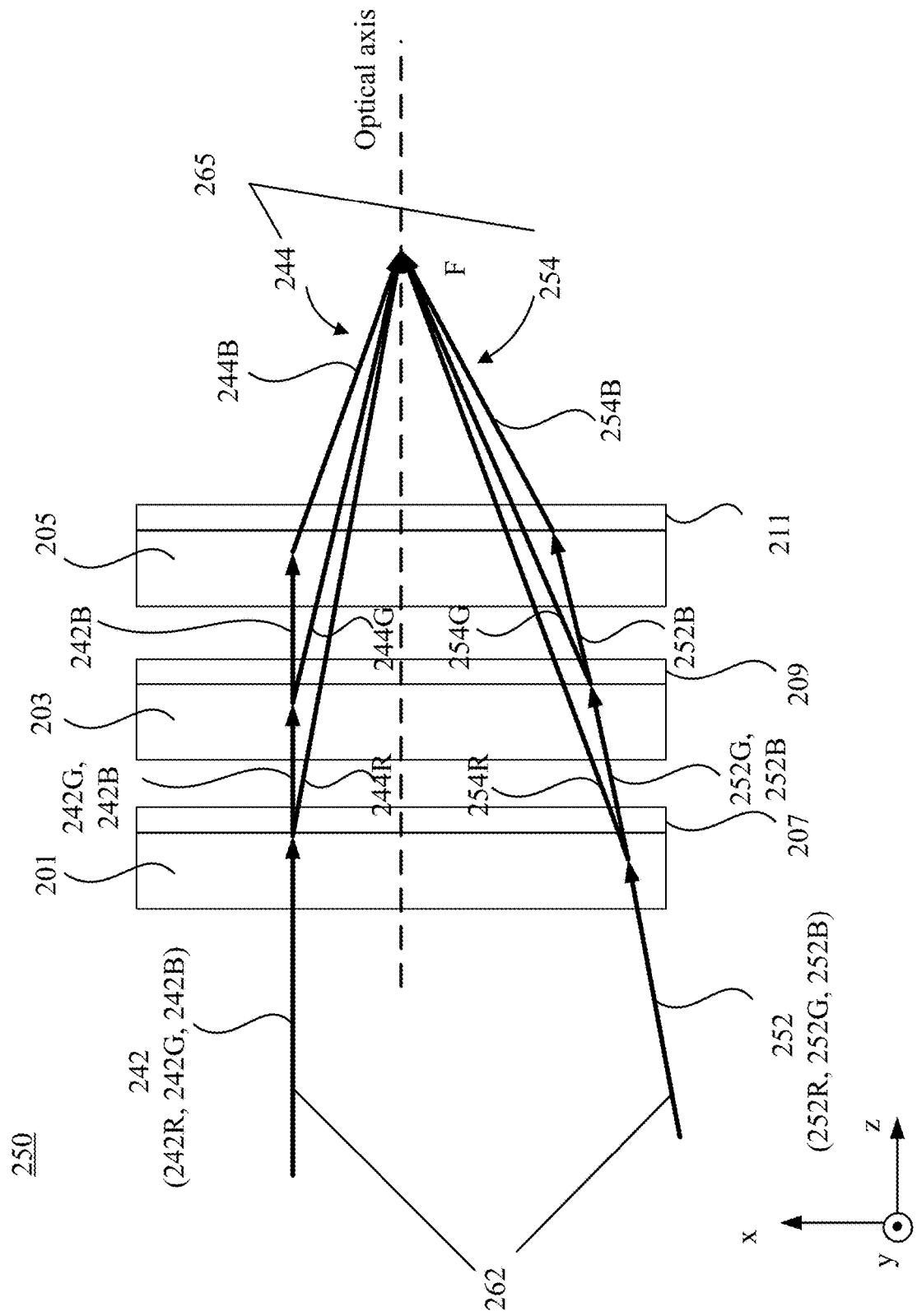
FIG. 2C schematically illustrates a diagram of an apochromatic PVH device, according to an embodiment of the present disclosure.

FIG. 2C schematically illustrates an x-z sectional view of an apochromatic PVH device 250, according to an embodiment of the present disclosure. The apochromatic PVH device 250 may include elements that are the same as or similar to those included in the apochromatic PVH device 200 shown in FIG. 2A, or the apochromatic PVH device 230 shown in FIG. 2B. Descriptions of the same or similar elements may refer to the above descriptions rendered in connection with FIG. 2A or FIG. 2B. In some embodiments, the apochromatic PVH device 250 may function as an apochromatic PVH lens configured to focus both of a substantially on-axis or axis-parallel polychromatic light and an off-axis polychromatic light to a single common focal point. In some embodiments, the apochromatic PVH device 250 may function as an apochromatic PVH beam deflector configured to steer (or deflect) both of a substantially on-axis or axis-parallel polychromatic light and an off-axis polychromatic light in a single common (or same) steering (or deflecting) angle. For discussion purposes, in the following description, an axis-parallel polychromatic light is used as an example of a substantially on-axis or axis-parallel polychromatic light.

As shown in FIG. 2C, the PVH device 250 may include a plurality of (e.g., three) T-PVH elements 201, 203, and 205 and one or more compensation plates 207, 209, and 211 alternately arranged in an optical series. The compensation plates 207, 209, and 211 may be configured to increase the angular performance of the apochromatic PVH device 250. For discussion purposes, FIG. 2C shows that the compensation plates 207, 209, and 211 are disposed adjacent and aligned with the PVH elements 201, 203, and 205, respectively. The apochromatic PVH device 250 may include any other suitable number of compensation plates, such as one, two, or four, etc.

In some embodiments, the PVH element 201, 203, or 205 that operates as a half-wave plate (or full-wave plate) for an axis-parallel light (or ray) of a predetermined color channel may not operate as a half-wave plate (or full-wave plate) for an off-axis light (or ray) of the predetermined color channel. In some embodiments, in addition to the desirable half-wave (or full-wave) phase retardance, the PVH element 201, 203, or 205 may provide an undesirable phase retardance to the off-axis light (or ray) of the predetermined color channel, which may degrade the apochromatic performance of the PVH device 250. For example, due to the undesirable phase retardances experienced by the off-axis incident light (or ray) when transmitting through the PVH elements 201, 203, and 205, the off-axis incident light (or ray) may be focused to a focal point that is different from a common focal point designed for the axis-parallel incident light (or ray), or may be deflected in a deflecting angle that is different from a common deflection angle designed for the axis-parallel incident light (or ray).

For discussion purposes, the undesirable phase retardance may be referred to as an additional phase retardance. The additional phase retardance may have an amount that is positive or negative. When the additional phase retardance has a positive amount, an overall phase retardance experienced by the off-axis light (or ray) of the predetermined color channel transmitted through the PVH element 201, 203, or 205 may be greater than the half-wave (or full-wave) phase retardance. When the additional phase retardance has a negative amount, an overall phase retardance experienced by the off-axis light (or ray) of the predetermined color channel transmitted through the PVH element 201, 203, or 205 may be less than the half-wave (or full-wave) phase retardance.

The compensation plate 207, 209, or 211 may be any suitable compensation plate configured to compensate for the additional phase retardance experienced by the off-axis light (or ray) of the predetermined color channel transmitted through the PVH element 201, 203, or 205. In some embodiments, at least one (e.g., each) of the compensation plate 207, 209, or 211 may be a uniaxial compensation plate or a biaxial compensation plate. In some embodiments, the uniaxial compensation plate may include a C-plate, an O-plate, etc. For discussion purposes, the compensation plates 207, 209, and 211 may also be referred to as the first compensation plate 207, the second compensation plate 209, and the third compensation plate 211, respectively. A birefringent effect of the compensation plate 207, 209, or 211 may at least partially compensate for a birefringent effect of the PVH element 201, 203, or 205 for an off-axis light (or ray) incident thereon. The compensation plate 207, 209, or 211 may be configured to reduce the additional phase retardance introduced by the PVH element 201, 203, or 205 to an angular, off-axis light (or ray) incident onto the PVH element 201, 203, or 205. In some embodiments, the compensation plate 207, 209, or 211 may include multi-birefringent films fabricated based on stretched polymer or LC materials. In some embodiments, the compensation plate 207, 209, or 211 may be configured to provide a zero birefringence (or phase retardance) for an axis-parallel incident light (or ray) of a predetermined color channel, while providing a non-zero birefringence (or phase retardance) for an off-axis light (or ray) of the predetermined color channel. The non-zero birefringence (or net phase retardance) may be a function of an incidence angle of the off-axis light (or ray) with respect to the compensation plate 207, 209, or 211. In some embodiments, the compensation plate 207, 209, or 211 may be configured to have a birefringence (or phase retardance) that has the same angular dependency as the birefringence (or phase retardance) of the adjacent PVH element 201, 203, or 205. In some embodiments, the compensation plate 207, 209, or 211 may be configured with a birefringence (or phase retardance) having an amount that is opposite to the amount of the birefringence (or phase retardance) of the adjacent PVH element 201, 203, or 205. For example, the compensation plate 207, 209, or 211 may provide a negative (or positive) phase retardance, while the corresponding adjacent PVH element 201, 203, or 205 may provide a positive (or negative) phase retardance.

For example, the compensation plate 207, 209, or 211 may be oriented relative to the PVH element 201, 203, or 205, such that the compensation plate 207, 209, or 211 may provide an amount of phase retardance that is opposite to the amount of the additional phase retardance introduced by the PVH element 201, 203, or 205 to an off-axis incident light (or ray), depending on an incidence angle of the off-axis incident light (or ray). The phase retardance provided by the compensation plate 207, 209, or 211 may at least partially reduce the additional phase retardance experienced by the off-axis light (or ray) transmitted through the PVH element 201, 203, or 205. In some embodiments, the phase retardance provided by the compensation plate 207, 209, or 211 may substantially cancel out the additional phase retardance experienced by the off-axis light (or ray) transmitted through the PVH element 201, 203, or 205. For example, the compensation plate 207, 209, or 211 may provide an amount of compensating phase retardance that is opposite to the amount of the additional phase retardance experienced by the off-axis light (or ray) transmitted through the PVH element 201, 203, or 205. In some embodiments, the absolute values of the compensating phase retardance and the additional phase retardance may be substantially the same, and the signs may be opposite. Thus, a combination of the PVH element 201, 203, or 205 and the corresponding compensation plate 207, 209, or 211 may be configured to operate as a half-wave plate (or full-wave plate) for the off-axis incident light (or ray) of the predetermined color channel. Accordingly, the additional phase retardance may not cause an undesirable effect in the light output from the PVH device 250 corresponding to the off-axis incident light (or ray) of the specific color channel. Thus, the PVH device 250 may focus the off-axis incident light (or ray) to a focal point that is substantially the same as a common focal point designed for the axis-parallel incident light (or ray), or may deflect the off-axis incident light (or ray) in a deflecting angle that is that is substantially the same as a common deflection angle designed for the axis-parallel incident light (or ray). As a result, the angular performance of the apochromatic PVH device 250 may be significantly improved.

In the embodiment shown in FIG. 2C, for discussion purposes, the PVH elements 201, 203, and 205 may be T-PVH lenses, which are also referred to as the first PVH lens 201, the second PVH lens 203, and the third PVH lens 205. The apochromatic PVH device 250 may function as an apochromatic lens with an enhanced angular performance. For discussion purposes, an incident light 262 of the PVH device 250 may be a polychromatic light including a portion of red color channel (e.g., the wavelength $\lambda_R$) (referred to as the red portion), a portion of green color channel (e.g., the wavelength $\lambda_G$) (referred to as the green portion), and a portion of blue color channel (e.g., the wavelength $\lambda_B$) (referred to as the blue portion). For discussion purposes, the light 262 may be an LHCP polychromatic light. The light 262 may include a plurality of substantially on-axis or axis-parallel rays 242 and a plurality of off-axis rays 252, which may be polychromatic rays including the respective red portions, the respective green portions, and the respective blue portions. For illustrative purposes, the light 262 is shown as being incident onto the PVH device 250 from a side of the first PVH lens 201. In some embodiments, the light 262 may be incident onto the PVH device 250 from a side of the third PVH lens 205.

For discussion purposes, FIG. 2C shows optical paths of a single axis-parallel ray 242 and a single off-axis ray 252. The axis-parallel ray 242 may include a red portion 242R, a green portion 242G, and a blue portion 242B. The PVH device 250 may focus the axis-parallel ray 242 to a target focal point F designed for the PVH lens 250, in a manner similar to the manner in which the polychromatic incident light 232 is focused, as shown in FIG. 2B. Detail descriptions may refer to the above descriptions rendered in connection with FIG. 2B. For example, the PVH device 250 may diffract the red portion 242R, the green portion 242G, and the blue portion 242B of the axis-parallel ray 242 as an RHCP red ray 244R, an RHCP green ray 244G, and an RHCP blue ray 244B, respectively. The RHCP red ray 244R, the RHCP green ray 244G, and the RHCP blue ray 244B may be substantially focused to the target focal point F. At an output side of the PVH device 250, the RHCP red ray 244R, the RHCP green ray 244G, and the RHCP blue ray 244B may form a polychromatic RHCP ray 244 that is focused to the target focal point F.

The off-axis ray 252 may include a red portion 252R, a green portion 252G, and a blue portion 252B. The first compensation plate 207 may be disposed adjacent the first PVH lens 201, and between the first PVH lens 201 and the second PVH lens 203. The first compensation plate 207 may be oriented relative to the first PVH lens 201 to compensate for the additional phase retardances introduced by the first PVH lens 201 to the red portion 252R, the green portion 252G, and the blue portion 252B of the off-axis ray 252. In some embodiments, due to such compensations, the first PVH lens 201 and the first compensation plate 207 together may be configured to operate as a half-wave plate for an off-axis incident light (or ray) of red color channel, and operate as a full-wave plate for an off-axis light (or ray) of green color channel and an off-axis light (or ray) of blue color channel. In some embodiments, due to such compensations, the additional phase retardances may not cause an undesirable effect in the lights output from the first PVH lens 201 and the first compensation plate 207 corresponding to the red portion 252R, the green portion 252G, and the blue portion 252B of the off-axis ray 252.

The first PVH lens 201 and the first compensation plate 207 together may transform the red portion 252R of the off-axis ray 252 as an RHCP red light 254R that is focused to the target focal point F. In other words, the first PVH lens 201 and the first compensation plate 207 together may focus the red portion 252R of the off-axis ray 252 to the target focal point F. In addition, the first PVH lens 201 and the first compensation plate 207 together may substantially transmit, with negligible diffraction, the green portion 252G and the blue portion 252B of the off-axis ray 252 toward the second PVH lens 203. The first PVH lens 201 and the first compensation plate 207 together may substantially maintain at least one (e.g., all) of the propagation directions, the wavefronts, or the polarizations of the green portion 252G and the blue portion 252B of the off-axis ray 252. The RHCP red ray 254R, and the green portion 252G and the blue portion 252B of the off-axis ray 252 may be obliquely incident onto the second PVH lens 203.

The second compensation plate 209 may be disposed adjacent the second PVH lens 203, between the second PVH lens 203 and the third PVH lens 205. The second compensation plate 209 may be oriented relative to the second PVH lens 203 to compensate for the additional phase retardances introduced by the second PVH lens 203 to the RHCP red ray 254R, and the green portion 252G and the blue portion 252B of the off-axis ray 252. In some embodiments, due to such compensations, the second PVH lens 203 and the second compensation plate 209 together may be configured to operate as a half-wave plate for an off-axis light (or ray) of green color channel, and operate as a full-wave plate for an off-axis light (or ray) of red color channel and an off-axis light (or ray) of blue color channel. In some embodiments, due to such compensations, the additional phase retardances may not cause an undesirable effect in the lights output from the second PVH lens 203 and the second compensation plate 209 corresponding to the RHCP red ray 254R, and the green portion 252G and the blue portion 252B of the off-axis ray 252.

The second PVH lens 203 and the second compensation plate 209 together may transform the green portion 252G of the off-axis ray 252 as an RHCP green ray 254G that is focused to the target focal point F. In other words, the second PVH lens 203 and the second compensation plate 209 together may focus the green portion 252G of the off-axis ray 252 to the target focal point F. In addition, the second PVH lens 203 and the second compensation plate 209 together may substantially transmit, with negligible diffraction, the RHCP red ray 254R, substantially maintaining at least one (e.g., all) of the polarization, propagation direction, or wavefront of the RHCP red ray 254R. The second PVH lens 203 and the second compensation plate 209 together may substantially transmit, with negligible diffraction, the blue portion 252B of the off-axis ray 252, substantially maintaining at least one (e.g., all) of the propagation directions, the wavefronts, or the polarizations of the blue portion 252B of the off-axis ray 252. The RHCP red ray 254R, the RHCP green ray 254G, and the blue portion 252B of the off-axis ray 252 may be obliquely incident onto the third PVH lens 205.

The third compensation plate 211 may be disposed adjacent the third PVH lens 205, and the third PVH lens 205 may be disposed between the second compensation plate 209 and the third compensation plate 211. The third compensation plate 211 may be oriented relative to the third PVH lens 205 to compensate for the additional phase retardances introduced by the third PVH lens 205 to the RHCP red ray 254R, the RHCP green ray 254G, and the blue portion 252B of the off-axis ray 252. In some embodiments, due to such compensations, the third PVH lens 205 and the third compensation plate 211 together may be configured to operate as a half-wave plate for an off-axis light (or ray) of blue color channel, and operate as a full-wave plate for an off-axis light (or ray) of red color channel and an off-axis light (or ray) of green color channel. In some embodiments, due to such compensations, the additional phase retardances may not cause an undesirable effect in the lights output from the third PVH lens 205 and the third compensation plate 211 corresponding to the RHCP red ray 254R, the RHCP green ray 254G, and the blue portion 252B of the off-axis ray 252.

The third PVH lens 205 and the third compensation plate 211 together may transform the blue portion 252B of the off-axis ray 252 as an RHCP green ray 254B that is focused to the target focal point F. In other words, the third PVH lens 205 and the third compensation plate 211 together may focus the blue portion 252B of the off-axis ray 252 to the target focal point F. In addition, the third PVH lens 205 and the third compensation plate 211 together may substantially transmit, with negligible diffraction, the RHCP red ray 254R and RHCP green ray 254G, while substantially maintaining at least one (e.g., all) of the polarizations, propagation directions, or wavefronts of the RHCP red ray 254R and RHCP green ray 254G.

Thus, the PVH device 250 may diffract the red portion 252R, the green portion 252G, and the blue portion 252B of the off-axis ray 252 as the RHCP red ray 254R, the RHCP green ray 254G, and the RHCP blue ray 254B, respectively. The RHCP red ray 254R, the RHCP green ray 254G, and the RHCP blue ray 254B may be focused to the same target focal point F designed for the PVH device 250. Thus, at an output side of the PVH device 250, the RHCP red ray 254R, the RHCP green ray 254G, and the RHCP blue ray 254B form a polychromatic RHCP ray 254 that is focused to the target focal point F. Referring to FIG. 2C, due to the compensation effect of the compensation plates 207, 209, and 211, the PVH device 250 may focus both of the axis-parallel ray 242 and the off-axis polychromatic ray 252 to the single common (or same) focal point F designed for the PVH device 250. At an output side of the PVH device 250, the polychromatic RHCP ray 244 and the polychromatic RHCP ray 254 form a polychromatic RHCP light 265 that is focused to the common focal point F.

For discussion purposes, FIG. 2C shows three compensation plates (e.g., C-plates, O-plates, biaxial plates, etc.) 207, 209, and 211 for respective PVH gratings 201, 203, and 205. The apochromatic PVH device 250 may include any other suitable number of compensation plates, such as one, two, or four, etc. For example, in some embodiments, the apochromatic PVH device 250 may include a single compensation plate (e.g., a single C-plate, a single O-plate, or a single biaxial plate), which may be disposed at the output side of the apochromatic PVH device 250. In some embodiments, such a single compensation plate may be a multi-layer compensation plate, which may be a relatively thick birefringent film stack. The single compensation plate may be configured with optical properties, such as a birefringence, based on optical properties of the PVH elements 201, 203, and 205, such that the single compensation plate may compensate for the additional phase retardances introduced by the PVH elements 201, 203, and 205 to the off-axis ray 252.

Figure 3A:
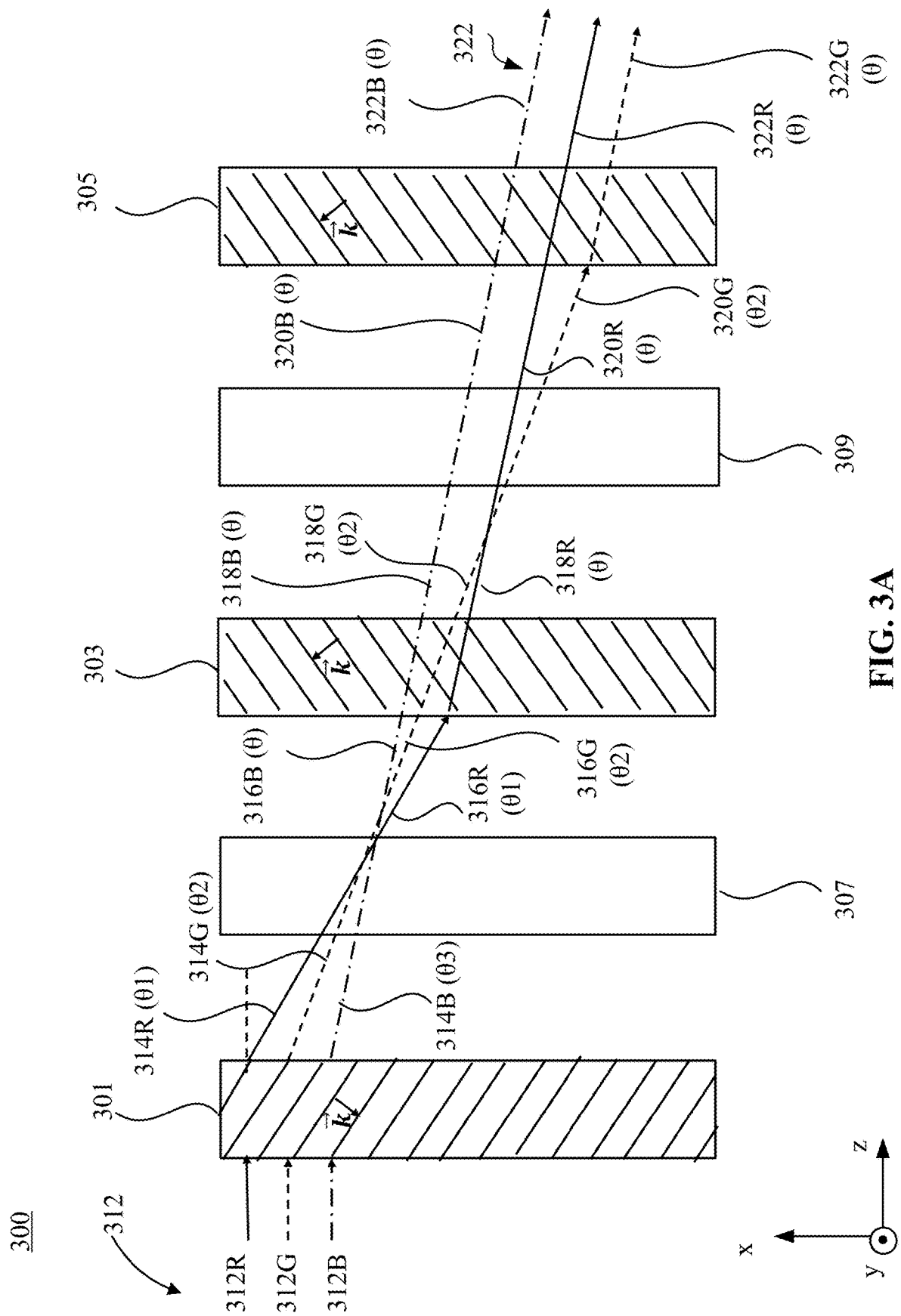
FIG. 3A schematically illustrates a diagram of an apochromatic PVH device, according to an embodiment of the present disclosure.

FIG. 3A schematically illustrates an x-z sectional view of an apochromatic PVH device 300, according to an embodiment of the present disclosure. The apochromatic PVH device 300 may include elements that are the same as or similar to those included in the apochromatic PVH device 200 shown in FIG. 2A, the apochromatic PVH device 230 shown in FIG. 2B, or the apochromatic PVH device 250 shown in FIG. 2C. Descriptions of the same or similar elements may refer to the above descriptions rendered in connection with FIG. 2A, FIG. 2B, or FIG. 2C. As shown in FIG. 3A, the PVH device 300 may include a plurality of (e.g., three) T-PVH elements 301, 303, and 305, and a plurality of color-selective waveplates 307 and 309 alternately arranged with the T-PVH elements 301, 303, and 305. A color-selective waveplate 307 or 309 may be disposed between two neighboring PVH elements 301, 303, and 305.

For discussion purposes, FIG. 3A shows the PVH elements 301, 303, and 305, and the color-selective waveplates 307 and 309 are spaced apart from one another with a gap. In some embodiments, the PVH elements 301, 303, and 305, and the color-selective waveplates 307 and 309 may be directly coupled to one another without a gap therebetween. In some embodiments, the PVH elements 301, 303, and 305, and the color-selective waveplates 307 and 309 may be directly coupled to one another without another optical element disposed therebetween. In some embodiments, the PVH elements 301, 303, and 305, and the color-selective waveplates 307 and 309 may be indirectly coupled to one another with another optical element (e.g., a compensation plate) disposed therebetween.

In some embodiments, at least one (e.g., each) of the PVH elements 301, 303, and 305 may be configured to operate at three color channels (e.g., red, green, and blue color channels). In some embodiments, the PVH elements 301, 303, and 305 may be configured with the same polarization selectivity. For example, the PVH elements 301, 303, and 305 may be left-handed PVH elements configured to substantially forwardly diffract an LHCP light, and substantially transmit, with negligible diffraction, an RHCP light. In some embodiments, the PVH elements 301, 303, and 305 may be right-handed PVH elements. In some embodiments, at least one (e.g., each) of the PVH elements 301, 303, and 305 may be configured to substantially forwardly diffract LHCP lights of different color channels in different diffraction angles, e.g., wavelength-dependent diffraction angles. For example, each of the PVH elements 301, 303, and 305 may be configured to substantially forwardly diffract LHCP lights of red, green, and blue color channels in three different diffraction angles, and substantially transmit, with negligible diffraction, RHCP lights of red, green, and blue color channels.

In some embodiments, the PVH elements 301, 303, and 305 may be configured to substantially forwardly diffract an LHCP light (e.g. an axis-parallel LHCP light) of the same color channel in three diffraction angles, respectively. In some embodiments, at least two of the three diffraction angles may be different from one another. In some embodiments, the PVH elements 301, 303, and 305 may be configured to substantially forwardly diffract an LHCP light of the same color channel in three diffraction angles having different values and/or different signs. For example, the three diffraction angles may include both of a positive diffraction angle and a negative diffraction angle. In some embodiments, the PVH elements 301, 303, and 305 may be configured to substantially forwardly diffract an LHCP light of the red color channel in three diffraction angles having different values and/or different signs, substantially forwardly diffract an LHCP light of the green color channel in three diffraction angles having different values and/or different signs, and substantially forwardly diffract an LHCP light of the blue color channel in three different diffraction angles having different values and/or different signs.

In some embodiments, the color-selective waveplate 307 or 309 may be configured as a multi-layer birefringent film. In some embodiments, the color-selective waveplate 307 or 309 may be configured to operate as a half-wave plate for a predetermined color channel in the three color channels (e.g., red, green, and blue color channels), and operate as a full-wave plate (e.g., one-wave plate) for each of the remaining color channels in the three color channels. In some embodiments, the color-selective waveplate 307 or 309 operating as a half-wave plate for the predetermined color channel may reverse the handedness of a circularly polarized light of the predetermined color channel, while transmitting the circularly polarized light. In some embodiments, the color-selective waveplate 307 or 309 operating as a full-wave plate for the other color channels may substantially maintain the handedness of a circularly polarized light of the other color channels, while transmitting the circularly polarized light.

In some embodiments, the color-selective waveplate 307 or 309 disposed before a corresponding PVH element 303 or 305 in a propagating direction of a circularly polarized light may be configured to control a handedness of the circularly polarized light before the circularly polarized light is incident onto the corresponding PVH element 303 or 305. In the embodiment shown in FIG. 3A, the color-selective waveplates 307 may be referred to as a first color-selective waveplate 307. The first color-selective waveplate 307 may be disposed between the first PVH element 301 and the second PVH element 303. The color-selective waveplate 309 may be referred to as a second color-selective waveplate 309. The second color-selective waveplate 309 may be disposed between the second PVH element 303 and the third PVH element 305. The first color-selective waveplate 307 may be configured to control a handedness of a circularly polarized light after output from the first PVH element 301 before incident onto the second PVH element 303. The second color-selective waveplate 309 may be configured to control a handedness of a circularly polarized light after output from the second PVH element 303 and before incident onto the third PVH element 305.

In some embodiments, the PVH elements 301, 303, and 305 may be T-PVH gratings, and the apochromatic PVH device 300 may function as an apochromatic beam deflector. In some embodiments, the PVH elements 301, 303, and 305 may be T-PVH lenses, and the apochromatic PVH device 300 may function as an apochromatic PVH lens. For discussion purposes, in the embodiment shown in FIG. 3A, the PVH elements 301, 303, and 305 are shown as T-PVH gratings, which may be referred to as a first PVH grating 301, a second PVH grating 303, and a third PVH grating 305. For discussion purpose, the PVH gratings 301, 303 and 305 are presumed to have the same polarization selectivity. For example, the PVH gratings 301, 303 and 305 are presumed to be left-handed PVH gratings.

In the embodiment shown in FIG. 3A, two of the PVH gratings 301, 303 and 305 may be configured with grating vectors $\vec{k}$ in a same first direction, and the remaining one of the PVH gratings 301, 303 and 305 may be configured with a grating vector $\vec{k}$ in a second, different direction. In some embodiments, the first direction may not be parallel or anti-parallel to the second direction. In some embodiments, the first direction and the second direction may be configured, such that two of the PVH gratings 301, 303 and 305 may be configured to diffract an input LHCP light in a clockwise (or counter-clockwise) direction with respect to a surface normal of the respective PVH gratings. The remaining one of the PVH gratings 301, 303 and 305 may be configured to diffract an input LHCP light in a counter-clockwise (or clockwise) direction with respect to a surface normal of the PVH grating. In some embodiments, when the input LHCP light is substantially on-axis or axis-parallel, the PVH gratings 301, 303 and 305 may be configured to diffract the input LHCP light in three diffraction angles, respectively, two of which may have the same sign and the remaining one may have an opposite sign. For example, two of the PVH gratings 301, 303 and 305 may be configured to diffract the input LHCP light in positive (or negative) diffraction angles, and while the remaining one of the PVH gratings 301, 303 and 305 may be configured to diffract the input LHCP light in a negative (or positive) diffraction angle.

For discussion purposes, FIG. 3A shows that the second PVH grating 303 and the third PVH grating 305 are configured with grating vectors $\vec{k}$ in the first direction, and the first PVH grating 301 is configured with a grating vector $\vec{k}$ in the second, different direction. The first direction and the second direction may be configured, such that the second PVH grating 303 and the third PVH grating 305 may be configured to diffract an input LHCP light in a counter-clockwise (or clockwise) direction with respect to a surface normal of the receptive PVH grating. A surface normal as used herein may be a normal of a light outputting surface of an optical element (e.g., the PVH grating). The first PVH grating 301 may be configured to diffract an input LHCP light in a clockwise (or counter-clockwise) direction with respect to a surface normal of the first PVH grating 301. In some embodiments, the amplitudes of the grating vectors $\vec{k}$ of the PVH gratings 301, 303, and 305 may be substantially the same. In some embodiments, the amplitudes of the grating vectors $\vec{k}$ of the PVH gratings 301, 303, and 305 may be different from one another. For example, the amplitudes of the grating vectors $\vec{k}$ of at least two of the PVH gratings 301, 303, and 305 may be different from one another.

For discussion purposes, an incident light 312 of the PVH device 300 may be a polychromatic light including a portion 312R of red color channel (e.g., the wavelength $\lambda_R$) (referred to as a red portion 312R), a portion 312G of green color channel (e.g., the wavelength $\lambda_G$) (referred to as a green portion 312G), and a portion 312B of blue color channel (e.g., the wavelength $\lambda_B$) (referred to as a blue portion 312B). For discussion purposes, the light 312 may be an LHCP polychromatic light. For discussion purposes, the light 312 may be substantially normally incident onto the PVH device 300. In other words, the light 312 may be a substantially on-axis or axis-parallel incident light of the PVH device 300. For illustrative purposes, the light 312 is shown as being incident onto the PVH device 300 from a side of the first PVH grating 301. In some embodiments, the light 312 may be incident onto the PVH device 300 from a side of the third PVH grating 305.

In the embodiment shown in FIG. 3A, the amplitude and the direction of the grating vector $\vec{k}$ of the first PVH grating 301 may be the configured, such that the first PVH grating 301 may substantially forwardly diffract the red portion 312R, the green portion 312G, and the blue portion 312B of the LHCP light 312 in a clockwise direction relative to original propagation directions of the red portion 312R, the green portion 312G, and the blue portion 312B of the LHCP light 312 (or relative to a surface normal of the first PVH grating 301). The first PVH grating 301 may substantially forwardly diffract the red portion 312R, the green portion 312G, and the blue portion 312B of the LHCP light 312 as an RHCP red light 314R having a diffraction angle θ1, an RHCP green light 314G having a diffraction angle θ2, and an RHCP blue light 314B having a diffraction angle θ3, respectively. For discussion purposes, the diffraction angles θ1, θ2, and θ3 may be positive diffraction angles. The diffraction angles θ1, θ2, and θ3 may be different from one another, and may be wavelength dependent. In the embodiment shown in FIG. 3A, the diffraction angle θ1 may be larger than both of the diffraction angle θ2 and the diffraction angle θ3, and the diffraction angle θ2 may be larger than the diffraction angle θ3. That is, θ1>θ2>θ3. For discussion purposes, the diffraction angle θ3 may be a target diffraction angle θ designed for the PVH device 300, i.e., θ3=θ.

In the embodiment shown in FIG. 3A, the first color-selective waveplate 307 may be configured to operate as a half-wave plate for the red color channel, and operate as a full-wave plate for each of the green color channel and the blue color channel. Thus, the first color-selective waveplate 307 may be configured to convert the RHCP red light 314R into an LHCP red light 316R, and transmit the RHCP green light 314G and the RHCP blue light 314B as an RHCP green light 316G and an RHCP blue light 316B, respectively.

The second PVH grating 303 may substantially forwardly diffract the LHCP red light 316R as an RHCP red light 318R, and substantially transmit, with negligible diffraction, the RHCP green light 316G and the RHCP blue light 316B as an RHCP green light 318G and an RHCP blue light 318B, respectively. In the embodiment shown in FIG. 3A, the amplitude and the direction of the grating vector $\vec{k}$ of the second PVH grating 303 may be configured, such that the second PVH grating 303 may substantially forwardly diffract the LHCP red light 316R in a counter-clockwise direction relative to the original propagation direction of the LHCP red light 316R (or relative to a surface normal of the second PVH grating 303). The RHCP red light 318R may have a diffraction angle that is smaller than the diffraction angle θ1 of the LHCP red light 316R. In the embodiment shown in FIG. 3A, the diffraction angle of the RHCP red light 318R may be configured to be substantially the same as the target diffraction angle θ.

In the embodiment shown in FIG. 3A, the second color-selective waveplate 309 may be configured to operate as a half-wave plate for the green color channel, and operate as a full-wave plate for each of the red color channel and the blue color channel. Thus, the second color-selective waveplate 309 may be configured to convert the RHCP green light 318G into an LHCP green light 320G, and transmit the RHCP red light 318G and the RHCP blue light 318B as an RHCP red light 320G and an RHCP blue light 320B, respectively.

The third PVH grating 305 may substantially forwardly diffract the LHCP green light 320G as an RHCP green light 322G, and substantially transmit, with negligible diffraction, the RHCP red light 320R and the RHCP blue light 320B as an RHCP red light 322R and an RHCP blue light 322B, respectively. In the embodiment shown in FIG. 3A, the amplitude and the direction of the grating vector $\vec{k}$ of the third PVH grating 305 may be configured, such that the third PVH grating 305 may substantially forwardly diffract the LHCP green light 320G in a counter-clockwise direction relative to the original propagation direction of the LHCP green light 320G (or relative to a surface normal of the third PVH grating 305). The RHCP green light 322G may have a diffraction angle that is smaller than the diffraction angle θ2 of the LHCP green light 320G. In the embodiment shown in FIG. 3A, the diffraction angle of the RHCP green light 322G may be configured to be substantially the same as the target diffraction angle θ.

Thus, the PVH device 300 may respectively diffract the red portion 312R, the green portion 312G, and the blue portion 312B of the LHCP light 312 as the RHCP red light 322R, the RHCP green light 322G, and the RHCP blue light 322B having the common (or same) diffraction angle θ. At an output side of the PVH device 300, the RHCP red light 322R, the RHCP green light 322G, and the RHCP blue light 322B may form a polychromatic RHCP light 322 that is steered (or deflected) in a common steering angle (or deflecting angle) θ (with respect to a normal of a surface of the PVH device 300).

Figure 3B:
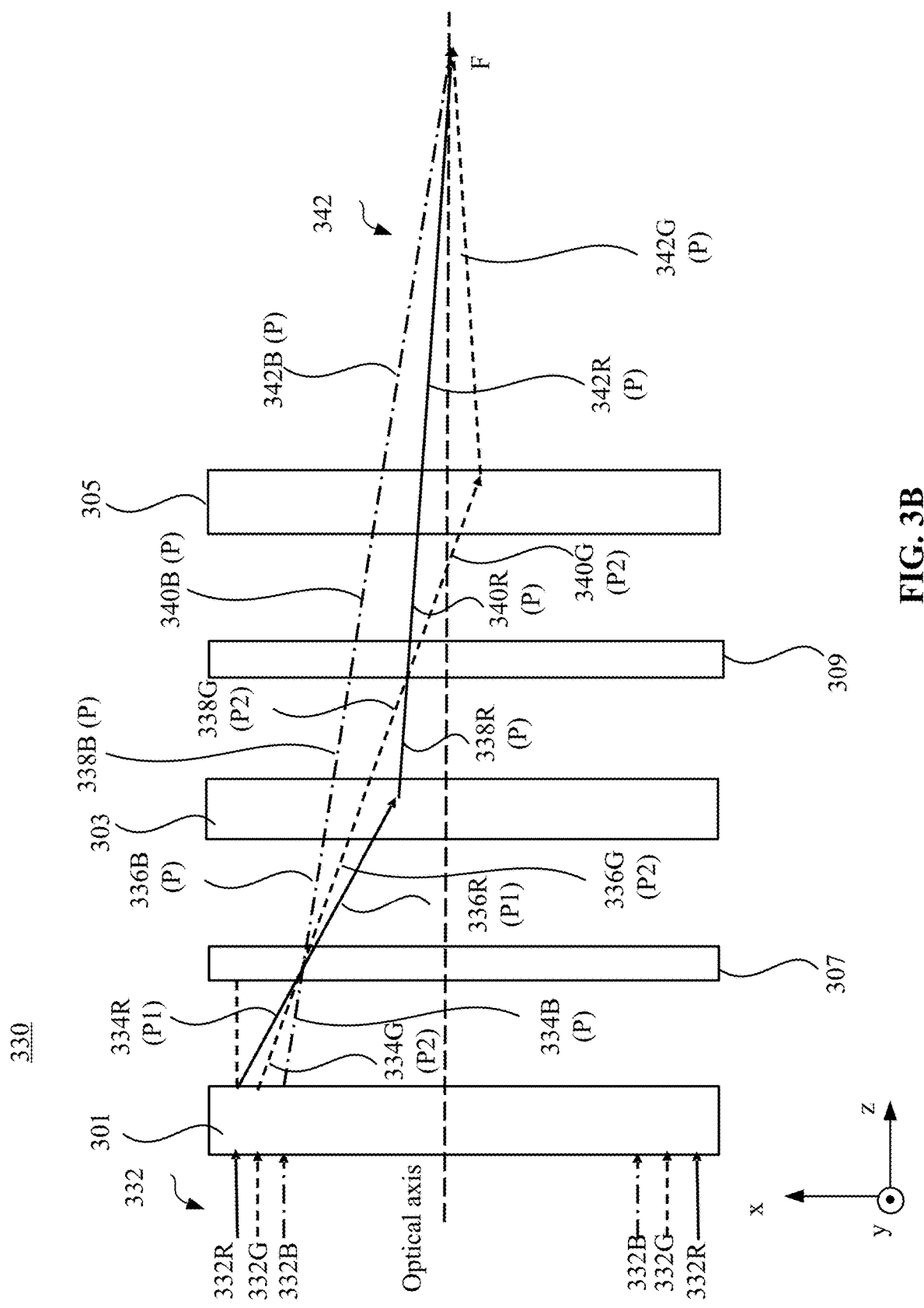
FIG. 3B schematically illustrates a diagram of an apochromatic PVH device, according to an embodiment of the present disclosure.

FIG. 3B schematically illustrates an x-z sectional view of an apochromatic PVH device 330, according to an embodiment of the present disclosure. The apochromatic PVH device 330 may include elements that are similar to those included in the apochromatic PVH device 200 shown in FIG. 2A, the apochromatic PVH device 230 shown in FIG. 2B, the apochromatic PVH device 250 shown in FIG. 2C, or the apochromatic PVH device 330 shown in FIG. 3A. Descriptions of the similar elements may refer to the above descriptions rendered in connection with FIG. 2A, FIG. 2B, FIG. 2C, or FIG. 3A. As shown in FIG. 3B, the PVH device 330 may include a plurality of (e.g., three) T-PVH elements 301, 303, and 305, and a plurality of (e.g., two) color-selective waveplates 307 and 309 alternately arranged.

In the embodiment shown in FIG. 3B, the PVH elements 301, 303, and 305 may be T-PVH lenses, which may be referred to as a first PVH lens 301, a second PVH lens 303, and a third PVH lens 305. For discussion purpose, the PVH lenses 301, 303, and 305 may have the same polarization selectivity. For example, the PVH lenses 301, 303 and 305 may be left-handed PVH lenses. In the embodiment shown in FIG. 3B, the PVH lenses 301, 303, and 305 may be configured to provide optical powers of different signs. In some embodiments, two of the PVH lenses 301, 303, and 305 may be configured to provide optical powers of the same sign, and the remaining one of the PVH lenses 301, 303, and 305 may be configured to provide an optical power of an opposite sign.

For example, for an LHCP incident light, the second PVH lens 303 and the third PVH lens 305 may be configured to provide optical powers having the same sign, while the first PVH lens 301 may be configured to provide an optical power having a sign that is opposite to the sign of the optical powers of the second PVH lens 303 and the third PVH lens 305. In the embodiment shown in FIG. 3B, for an LHCP incident light, the second PVH lens 303 and the third PVH lens 305 may be configured to provide negative optical powers, while the first PVH lens 301 may be configured to provide a positive optical power. In some embodiments, the absolute values of the optical powers of the PVH lenses 301, 303, and 305 may be substantially the same. In some embodiments, the absolute values of the optical powers of the PVH lenses 301, 303, and 305 may be different from one another. For example, the absolute values of the optical powers of at least two of the PVH lenses 301, 303, and 305 may be different from one another.

For discussion purposes, in FIG. 3B, an incident light 332 of the PVH device 330 may be a polychromatic light including a portion 332R of red color channel (e.g., the wavelength $\lambda_R$) (referred to as a red portion 332R), a portion 332G of green color channel (e.g., the wavelength $\lambda_G$) (referred to as a green portion 332G), and a portion 332B of blue color channel (e.g., the wavelength $\lambda_B$) (referred to as a blue portion 332B). For discussion purposes, the light 332 may be an LHCP polychromatic light. For discussion purposes, the light 332 may be substantially normally incident onto the PVH device 330. In other words, the light 332 may be a substantially on-axis or axis-parallel incident light of the PVH device 330. For illustrative purposes, the light 332 is shown as being incident onto the PVH device 330 from a side of the first PVH lens 301. In some embodiments, the light 332 may be incident onto the PVH device 330 from a side of the third PVH lens 305.

For discussion purposes, FIG. 3B merely shows the optical paths of the upper half of the LHCP light 332. The optical paths of the lower half of the LHCP light 332 mirrors the optical paths of the upper half, with respect to the optical axis. In the embodiment shown in FIG. 3B, the first PVH lens 301 may substantially forwardly diffract the red portion 332R, the green portion 332G, and the blue portion 332B of the LHCP light 332 as an RHCP red light 334R, an RHCP green light 334G, and an RHCP blue light 334B, respectively. In the embodiment shown in FIG. 3B, the first PVH lens 301 may be the configured to provide an optical power P1, an optical power P2, and an optical power P3 to the red portion 332R, the green portion 332G, and the blue portion 332B of the LHCP light 332, respectively. For discussion purposes, the optical powers P1, P2, and P3 may be positive optical powers. The absolute values of the optical powers P1, P2, and P3 may be different from one another, and may be wavelength dependent. In the embodiment shown in FIG. 3B, the optical power P1 may be greater than both of the optical power P2 and the optical power P3, and the optical power P2 may be greater than the optical power P3. That is, P1>P2>P3. For discussion purposes, the optical power P3 may be a target optical power P designed for the PVH device 330, i.e., P3=P.

In the embodiment shown in FIG. 3B, the first color-selective waveplate 307 may be configured to operate as a half-wave plate for the red color channel, and operate as a full-wave plate for each of the green color channel and the blue color channel. Thus, the first color-selective waveplate 307 may be configured to convert the RHCP red light 334R into an LHCP red light 336R, and transmit the RHCP green light 334G and the RHCP blue light 334B as an RHCP green light 336G and an RHCP blue light 336B, respectively.

The second PVH lens 303 may substantially forwardly diffract the LHCP red light 336R as an RHCP red light 338R, and substantially transmit, with negligible diffraction, the RHCP green light 336G and the RHCP blue light 336B as an RHCP green light 338G and an RHCP blue light 338B, respectively. In the embodiment shown in FIG. 3B, the second PVH lens 303 may be configured to provide a negative optical power to the LHCP red light 336R. The absolute value of the optical power provided by the second PVH lens 303 may be configured, such that an optical power provided by a combination of the first PVH lens 301 and the second PVH lens 303 to the red portion 332R of the LHCP light 332 may be smaller than the optical power P1 provided by the first PVH lens 301 only. In the embodiment shown in FIG. 3B, the optical power provided by the combination of the first PVH lens 301 and the second PVH lens 303 to the red portion 332R of the LHCP light 332 may be configured to be substantially the same as the target optical power P.

In the embodiment shown in FIG. 3B, the second color-selective waveplate 309 may be configured to operate as a half-wave plate for the green color channel, and operate as a full-wave plate for each of the red color channel and the blue color channel. Thus, the second color-selective waveplate 309 may be configured to convert the RHCP green light 338G into an LHCP green light 340G, and transmit the RHCP red light 338G and the RHCP blue light 338B as an RHCP red light 340G and an RHCP blue light 340B, respectively.

The third PVH lens 305 may substantially forwardly diffract the LHCP green light 340G as an RHCP green light 342G, and substantially transmit, with negligible diffraction, the RHCP red light 340R and the RHCP blue light 340B as an RHCP red light 342R and an RHCP blue light 342B, respectively. In the embodiment shown in FIG. 3B, the third PVH lens 305 may be configured to provide a negative optical power to the LHCP green light 340G. The absolute value of the optical power provided by the third PVH lens 305 may be configured, such that an optical power provided by a combination of the first PVH lens 301 and the third PVH lens 305 to the green portion 332G of the LHCP light 332 may be smaller than the optical power P1 provided by the first PVH lens 301 only. In the embodiment shown in FIG. 3B, the optical power provided by a combination of the first PVH lens 301 and the third PVH lens 305 to the green portion 332G of the LHCP light 332 may be configured to be substantially the same as the target optical power P.

Thus, the PVH device 330 may provide a substantially same optical power (e.g., the target optical power P) to the red portion 332R, the green portion 332G, and the blue portion 332B of the LHCP light 332. The PVH device 330 may respectively diffract the red portion 332R, the green portion 332G, and the blue portion 332B of the LHCP light 332 as the RHCP red light 342R, the RHCP green light 342G, and the RHCP blue light 342B that are focused to a common focal point F. At an output side of the PVH device 330, the RHCP red light 342R, the RHCP green light 342G, and the RHCP blue light 342B may form a polychromatic RHCP light 342 that is substantially focused to the target focal point F.

Figure 3C:
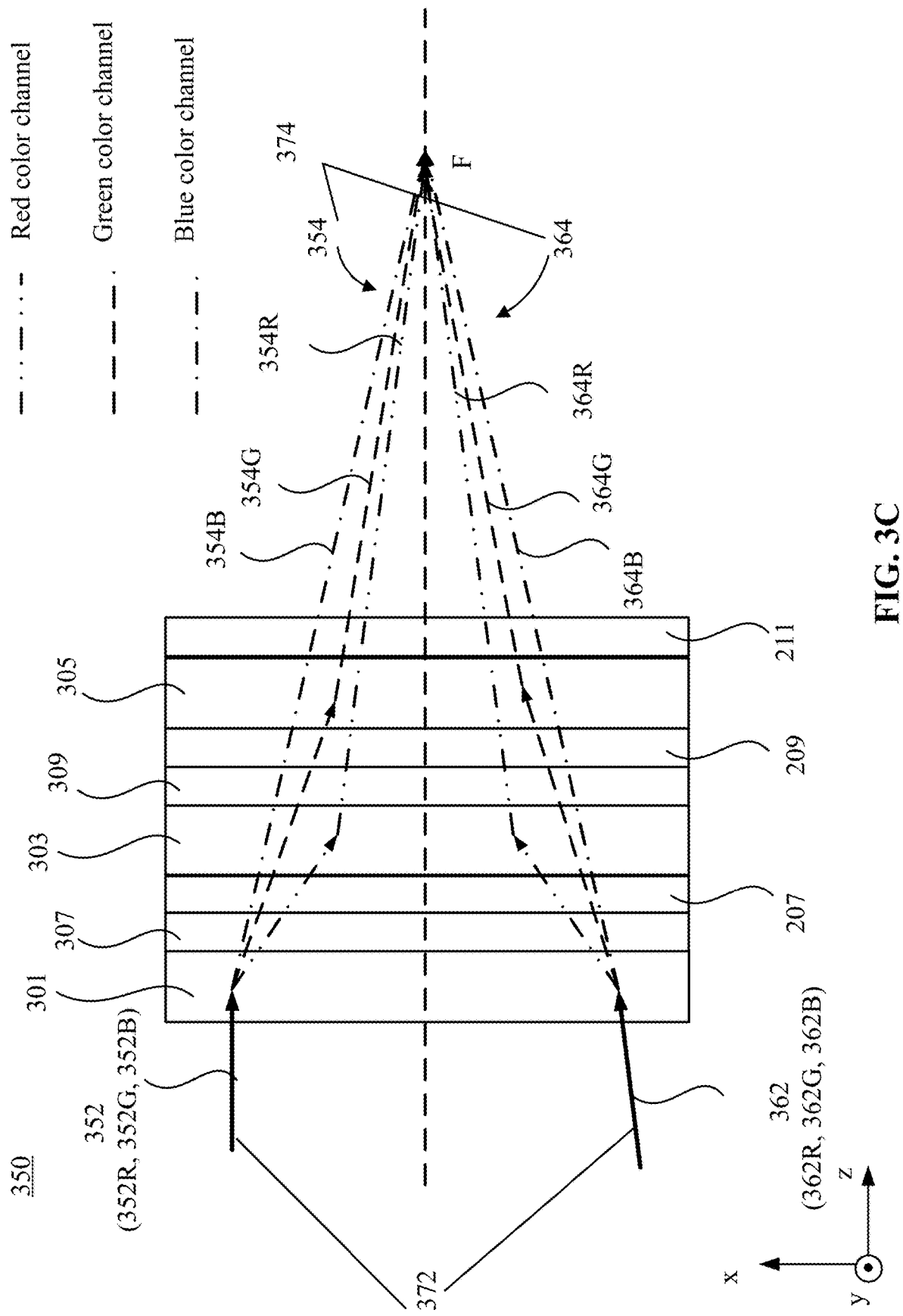
FIG. 3C schematically illustrates a diagram of an apochromatic PVH device, according to an embodiment of the present disclosure.

FIG. 3C schematically illustrates an x-z sectional view of an apochromatic PVH device 350, according to an embodiment of the present disclosure. The apochromatic PVH device 350 may include elements that are similar to those included in the apochromatic PVH device 200 shown in FIG. 2A, the apochromatic PVH device 230 shown in FIG. 2B, the apochromatic PVH device 250 shown in FIG. 2C, the apochromatic PVH device 300 shown in FIG. 3A, or the apochromatic PVH device 330 shown in FIG. 3B. Descriptions of the similar elements may refer to the above descriptions rendered in connection with FIG. 2A, FIG. 2B, FIG. 2C, FIG. 3A, or FIG. 3B.

In some embodiments, the apochromatic PVH device 350 may function as an apochromatic PVH lens configured to focus both of a substantially on-axis or axis-parallel polychromatic light and an off-axis polychromatic light to a single common focal point. In some embodiments, the apochromatic PVH device 350 may function as an apochromatic PVH beam deflector configured to steer (or deflect) both of a substantially on-axis or axis-parallel polychromatic light and an off-axis polychromatic light in a single common steering (or deflecting) angle. For discussion purposes, in the following description, an axis-parallel polychromatic light is used as an example of a substantially on-axis or axis-parallel polychromatic light.

As shown in FIG. 3C, the PVH device 350 may include a plurality of T-PVH elements 301, 303, and 305, a plurality of color-selective waveplates 307 and 309, and one or more compensation plates 207, 209, and 211 alternately arranged. The compensation plates 207, 209, and 211 may be configured to enhance the angular performance of the apochromatic PVH device 350. For discussion purposes, FIG. 3C shows that the PVH elements 301, 303, and 305, the color-selective waveplates 307 and 309, and the compensation plates 207, 209, and 211 are directly coupled to one another without a gap therebetween. In some embodiments, the PVH elements 301, 303, and 305, the color-selective waveplates 307 and 309, and the compensation plates 207, 209, and 211 may be directly optically coupled to one another without another optical element disposed therebetween. In some embodiments, the PVH elements 301, 303, and 305, the color-selective waveplates 307 and 309, and the compensation plates 207, 209, and 211 may be spaced apart from one another with a gap. In some embodiments, the PVH elements 301, 303, and 305, the color-selective waveplates 307 and 309, and the compensation plates 207, 209, and 211 may be indirectly optically coupled to one another with another optical element disposed therebetween.

For discussion purposes, FIG. 3C shows the PVH device 350 includes three PVH elements 301, 303, and 305, two color-selective waveplates 307 and 309, and three compensation plates 207, 209, and 211. In some embodiments, the apochromatic PVH device 350 may include any other suitable number of compensation plates, such as one, two, or four, etc. The compensation plate 207, 209 or 211 may be disposed adjacent the corresponding PVH element 301, 303, or 305, and at an output side of the corresponding PVH element 301, 303, or 305. The color-selective waveplate 307 or 309 may be disposed between two neighboring PVH elements 301, 303, and 305. In some embodiments, the color-selective waveplate 307 or 309 may be disposed between neighboring PVH element 301 or 303 and compensation plate 207 or 209. In the embodiment shown in FIG. 3C, the color-selective waveplate 307 may be disposed between the PVH element 301 and the compensation plate 207, and the compensation plate 207 may be disposed between the color-selective waveplate 307 and the PVH element 303. The color-selective waveplate 309 may be disposed between the PVH element 303 and the compensation plate 209, and the compensation plate 209 may be disposed between the color-selective waveplate 309 and the PVH element 305. The compensation plate 211 may be disposed behind the PVH element 305 in the propagation direction of the light 352.

In some embodiments, when the PVH elements 301, 303, and 305, and the color-selective waveplates 307 and 309 are configured to provide a design (or desirable) phase retardance for an axis-parallel light (or ray) of a predetermined color channel, the PVH elements 301, 303, and 305, and the color-selective waveplates 307 and 309 may not provide a substantially same design phase retardance for an off-axis light (or ray) of the predetermined color channel. In some embodiments, in addition to the phase retardance, the PVH elements 301, 303, and 305, and the color-selective waveplates 307 and 309 may provide an undesirable phase retardance to the off-axis light (or ray) of the predetermined color channel, which may degrade the apochromatic performance of the PVH device 350. For example, due to the undesirable phase retardances experienced by a polychromatic off-axis incident light (or ray) transmitting through the PVH elements 301, 303, and 305, and the color-selective waveplates 307 and 309, the polychromatic off-axis incident light (or ray) may be focused to a focal point that is different from a common focal point designed for a polychromatic axis-parallel incident light (or ray), or may be deflected in a deflecting angle that is different from a common deflection angle designed for a polychromatic, axis-parallel incident light (or ray). For discussion purposes, the undesirable phase retardance may be referred to as an additional or additional phase retardance. The additional phase retardance may be a positive or negative amount.

The compensation plates 207, 209, and 211 may be configured to at least partially compensate for the additional phase retardances experienced by the off-axis light (or ray). For example, the phase retardance provided by the compensation plates 207, 209, and 211 may at least partially reduce the additional phase retardance experienced by the off-axis light (or ray) transmitting through the PVH elements 301, 303, and 305, and the color-selective waveplates 307 and 309. In some embodiments, the phase retardance provided by the compensation plates 207, 209, and 211 may substantially cancel out the additional phase retardance experienced by the off-axis light (or ray) transmitting through the PVH elements 301, 303, and 305, and the color-selective waveplates 307 and 309. For example, the compensation plates 207, 209, and 211 may provide an amount of compensating phase retardance that is opposite to the amount of the additional phase retardance experienced by the off-axis light (or ray) transmitting through the PVH elements 301, 303, and 305, and the color-selective waveplates 307 and 309. In some embodiments, the absolute values of the amounts of compensating phase retardance and the additional phase retardance may be substantially the same, and the signs may be opposite. The compensation plate 207, 209, or 211 may be any suitable compensation plate configured to compensate for the additional phase retardance experienced by the off-axis light (or ray) of the predetermined color channel transmitted through the PVH element 201, 203, or 205. In some embodiments, at least one (e.g., each) of the compensation plates 207, 209, and 211 may be a uniaxial compensation plate or a biaxial compensation plate. In some embodiments, the uniaxial compensation plate may include a C-plate, or an O-plate, etc.

Due to the phase compensation of the compensation plates 207, 209, and 211 to the off-axis incident light (or ray), the effect of the additional phase retardance may not cause an undesirable effect in a light output from the stack of the PVH elements 301, 303, and 305, the color-selective waveplates 307 and 309, and the compensation plates 207, 209, and 211 corresponding to the off-axis incident light (or ray) of the specific color channel. Thus, the PVH device 350 may focus the off-axis incident light (or ray) to a focal point that is substantially the same as the common focal point designed for the axis-parallel incident light (or ray), or may deflect the off-axis incident light (or ray) in the deflecting angle that is substantially the same as the common deflection angle designed for axis-parallel incident light (or ray). The angular performance of the apochromatic PVH device 350 may be significantly enhanced.

In the embodiment shown in FIG. 3C, the PVH elements 301, 303, and 305 may be PVH lenses, and the apochromatic PVH device 350 may function as an apochromatic lens with an enhanced angular performance. For discussion purposes, the PVH lenses 301, 303, and 305 are presumed to be left-handed PVH lenses. For discussion purposes, an incident light 372 of the PVH device 350 is presumed to be a polychromatic light including a portion of red color channel (e.g., the wavelength $\lambda_R$) (referred to as a red portion), a portion of green color channel (e.g., the wavelength $\lambda_G$) (referred to as a green portion), and a portion of blue color channel (e.g., the wavelength $\lambda_B$) (referred to as a blue portion). For discussion purposes, the light 372 may be an LHCP polychromatic light. The light 372 may include a plurality of substantially on-axis or axis-parallel rays 352 and a plurality of off-axis rays 362, which may be polychromatic rays including the respective red portions, the respective green portions, and the respective blue portions. For illustrative purposes, the light 372 is shown as being incident onto the PVH device 350 from a side of the first PVH lens 301. In some embodiments, the light 372 may be incident onto the PVH device 350 from a side of the third PVH lens 305.

For discussion purposes, FIG. 3C shows optical paths of a single axis-parallel ray 352 and a single off-axis ray 362. The axis-parallel ray 352 may include a portion 352R of the red color channel (e.g., the wavelength $\lambda_R$) (referred to as a red portion 352R), a portion 352G of the green color channel (e.g., the wavelength $\lambda_G$) (referred to as a green portion 352G), and a portion 352B of the blue color channel (e.g., the wavelength $\lambda_B$) (referred to as a blue portion 352B). The PVH device 350 may focus the axis-parallel ray 352 to a target focal point F designed for the PVH lens 350, in a manner similar to the manner in which the polychromatic incident light 332 is focused, as shown in FIG. 3B. Detail descriptions may refer to the above descriptions rendered in connection with FIG. 3B. For example, the PVH device 350 may diffract the red portion 352R, the green portion 352G, and the blue portion 352B of the axis-parallel ray 352 as an RHCP red ray 354R, an RHCP green ray 354G, and an RHCP blue ray 354B, respectively. The RHCP red ray 354R, the RHCP green ray 354G, and the RHCP blue ray 354B may be focused to the target focal point F. At an output side of the PVH device 350, the RHCP red ray 354R, the RHCP green ray 354G, and the RHCP blue ray 354B may form a polychromatic RHCP ray 354 that is focused to the target focal point F.

The off-axis ray 362 may include a portion 362R of the red color channel (e.g., the wavelength $\lambda_R$) (referred to as a red portion 362R), a portion 362G of the green color channel (e.g., the wavelength $\lambda_G$) (referred to as a green portion 362G), and a portion 362B of the blue color channel (e.g., the wavelength $\lambda_B$) (referred to as a blue portion 362B). The first color-selective waveplate 307 and the first compensation plate 207 may be stacked with the first PVH lens 301. The first color-selective waveplate 307 may be disposed between the first PVH lens 301 and the first compensation plate 207. Compared to the portions 352R, 352G, and 352B of the respective color channels in the axis-parallel ray 352, the portions 362R, 362G, and 362B of the respective color channels in the off-axis ray 362 may experience respective additional phase retardances when propagating through the first PVH lens 301 and the first color-selective waveplate 307. The first compensation plate 207 may be oriented relative to the first PVH lens 301 and the first color-selective waveplate 307 to compensate for the respective additional phase retardances.

In some embodiments, for each of the portions 362R, 362G, and 362B in the off-axis ray 362, the first compensation plate 207 may be configured to provide an amount of compensating phase retardance that is opposite to the amount of the corresponding additional phase retardance. In some embodiments, for each of the portions 362R, 362G, and 362B in the off-axis ray 362, the absolute values of the compensating phase retardance and the additional phase retardance may be substantially the same and the signs may be opposite. Due to such compensations, the respective additional phase retardances may not cause an undesirable effect in lights output from the stack of the first PVH lens 301, the first color-selective waveplate 307, and the first compensation plate 207 corresponding to the portions 362R, 362G, and 362B of the respective color channels in the off-axis ray 362, respectively. In some embodiments, the portions 362R, 362G, and 362B in the off-axis ray 362 propagating through the first PVH lens 301, the first color-selective waveplate 307, and the first compensation plate 207 may experience the substantially same phase retardances and the substantially same optical powers as the portions 352R, 352G, and 352B in the axis-parallel ray 352, respectively.

The second color-selective waveplate 309 and the second compensation plate 209 may be stacked with the second PVH lens 303. The second color-selective waveplate 309 may be disposed between the second PVH lens 303 and the second compensation plate 209. Compared to the portions 352R, 352G, and 352B of the respective color channels in the axis-parallel ray 352, the portions 362R, 362G, and 362B of the respective color channels in the off-axis ray 362 may experience respective additional phase retardances when propagating through the second PVH lens 303 and the second color-selective waveplate 309. The second compensation plate 209 may be oriented relative to the second PVH lens 303 and the second color-selective waveplate 309 to compensate for the respective additional phase retardances.

In some embodiments, for each of the portions 362R, 362G, and 362B in the off-axis ray 362, the second compensation plate 209 may be configured to provide an amount of compensating phase retardance that is opposite to the amount of the corresponding additional phase retardance. In some embodiments, for each of the portions 362R, 362G, and 362B in the off-axis ray 362, the absolute values of the compensating phase retardance and the additional phase retardance may be substantially the same, and the signs may be opposite. Due to such compensations, the respective additional phase retardances may not cause an undesirable effect in lights output from the stack of the second PVH lens 303, the second color-selective waveplate 309, and the second compensation plate 209 corresponding to the portions 362R, 362G, and 362B of the respective color channels in the off-axis ray 362, respectively. In some embodiments, the portions 362R, 362G, and 362B in the off-axis ray 362 propagating through the second PVH lens 303, the second color-selective waveplate 309, and the second compensation plate 209 may experience the substantially same phase retardances and the substantially same optical powers as the portions 352R, 352G, and 352B in the axis-parallel ray 352, respectively.

The third compensation plate 211 may be stacked with the third PVH lens 305. The third PVH lens 305 may be disposed between the third compensation plate 211 and the second compensation plate 209. Compared to the portions 352R, 352G, and 352B of the respective color channels in the axis-parallel ray 352, the portions 362R, 362G, and 362B of the respective color channels in the off-axis ray 362 may experience respective additional phase retardances after propagating through the third PVH lens 305. The third compensation plate 211 may be oriented relative to the third PVH lens 305 to compensate for the respective additional phase retardances.

In some embodiments, for each of the portions 362R, 362G, and 362B in the off-axis ray 362, the third compensation plate 211 may be configured to provide an amount of compensating phase retardance that is opposite to the amount of the corresponding additional phase retardance. In some embodiments, for each of the portions 362R, 362G, and 362B in the off-axis ray 362, the absolute values of the compensating phase retardance and the additional phase retardance may be substantially the same, and the signs may be opposite. Due to such compensations, the respective additional phase retardances may not cause an effect in lights output from the stack of the third PVH lens 305 and the third compensation plate 211 corresponding to the portions 362R, 362G, and 362B of the respective color channels in the off-axis ray 362, respectively. In some embodiments, the portions 362R, 362G, and 362B in the off-axis ray 362 propagating through the third PVH lens 305 and the third compensation plate 211 may experience the substantially same phase retardances and the substantially same optical powers as the portions 352R, 352G, and 352B in the axis-parallel ray 352, respectively.

The PVH device 350 may diffract the portions 362R, 362G, and 362B of the respective color channels in the off-axis ray 362 as an RHCP red ray 364R, an RHCP green ray 364G, and an RHCP blue ray 364B, respectively. Due to the compensation effects of the compensation plates 207, 209, and 211, the RHCP red ray 364R, the RHCP green ray 364G, and the RHCP blue ray 364B may be substantially focused to the same target focal point F designed for the PVH device 350. At an output side of the PVH device 250, the RHCP red ray 364R, the RHCP green ray 364G, and the RHCP blue ray 364B may form a polychromatic RHCP ray 364 that is substantially focused to the target focal point F.

Referring to FIG. 3C, due to the compensation effects of the compensation plates 207, 209, and 211, the PVH device 350 may focus both of the axis-parallel ray 352 and the off-axis polychromatic ray 362 to the single common (or same) focal point F designed for the PVH device 350. At an output side of the PVH device 350, the polychromatic RHCP ray 354 and the polychromatic RHCP ray 364 may form a polychromatic RHCP light 374 that is substantially focused to the common focal point F designed for the PVH device 350.

For discussion purposes, FIG. 3C shows that the apochromatic PVH device 350 includes three compensation plates (e.g., C-plates, O-plates, or biaxial plates, etc.) 207, 209, and 211 for respective PVH gratings (and corresponding color-selective waveplates if included). In some embodiments, the apochromatic PVH device 350 may include any other suitable number of compensation plates, such as one, two, or four, etc. For example, in some embodiments, the apochromatic PVH device 350 may include a single compensation plate (e.g., a single C-plate, a single O-plate, or a single uniaxial plate, etc.), which may be disposed at the outside of the apochromatic PVH device 350. In some embodiments, such a single compensation plate may be a multi-layer compensation plate, which may be a relatively thick birefringent film stack (e.g., as compared to each of the compensation plates 207, 209, and 211). The single compensation plate may be configured with optical properties, such as birefringence, based on optical properties of the PVH elements 301, 303, and 305, and the color-selective waveplates 307 and 309, such that the single compensation plate may operate for the three color channels to compensate for the respective additional phase retardances, which may be introduced by the PVH elements 301, 303, and 305 and the color-selective waveplates 307 and 309 to the respective portions 362R, 362G, and 362B of the off-axis ray 362.

Referring to FIGS. 2A-3C, the T-PVH elements 201, 203, 205, 301, 303, and 305 described herein may be polarization hologram elements based on liquid crystals ("LCs") or birefringent photo-refractive holographic materials other than LCs. The T-PVH elements 201, 203, 205, 301, 303, and 305 described herein may be fabricated based on various methods, such as holographic interference, laser direct writing, ink-jet printing, and various other forms of lithography. Thus, a "hologram" described herein is not limited to creation by holographic interference, or "holography."

For illustrative purposes, FIGS. 2A-3C show the T-PVH elements 201, 203, 205 or 301, 303, 305, the compensation plates 207, 209, and 211, and the color-selective waveplates 307 and 309 as having flat surfaces. In some embodiments, one or more of the T-PVH elements 201, 203, 205 or 301, 303, 305, the compensation plates 207, 209, and 211, and the color-selective waveplates 307 and 309 may include one or more curved surfaces. In some embodiments, one or more of the T-PVH elements 201, 203, 205 or 301, 303, 305, the compensation plates 207, 209, and 211, and the color-selective waveplates 307 and 309 may include at least one of a birefringent material (e.g., an LC material) or a photo-refractive holographic material (e.g., an amorphous polymer). In some embodiments, one or more of the T-PVH elements 201, 203, 205 or 301, 303, 305, the compensation plates 207, 209, and 211, and the color-selective waveplates 307 and 309 may include one or more liquid crystal polymer ("LCP") films. In some embodiments, the disclosed apochromatic T-PVH device may be an LCP-based device including a plurality of LCP films stacked together. In some embodiments, LCP films may provide an enhanced performance when being coated or laminated on an optical element of a high curvature. In some embodiments, one or more of the LCP films may be configured to be index-matched films, such that an optical loss at an interface between neighboring LCP films may be reduced or minimized.

Figure 4A:
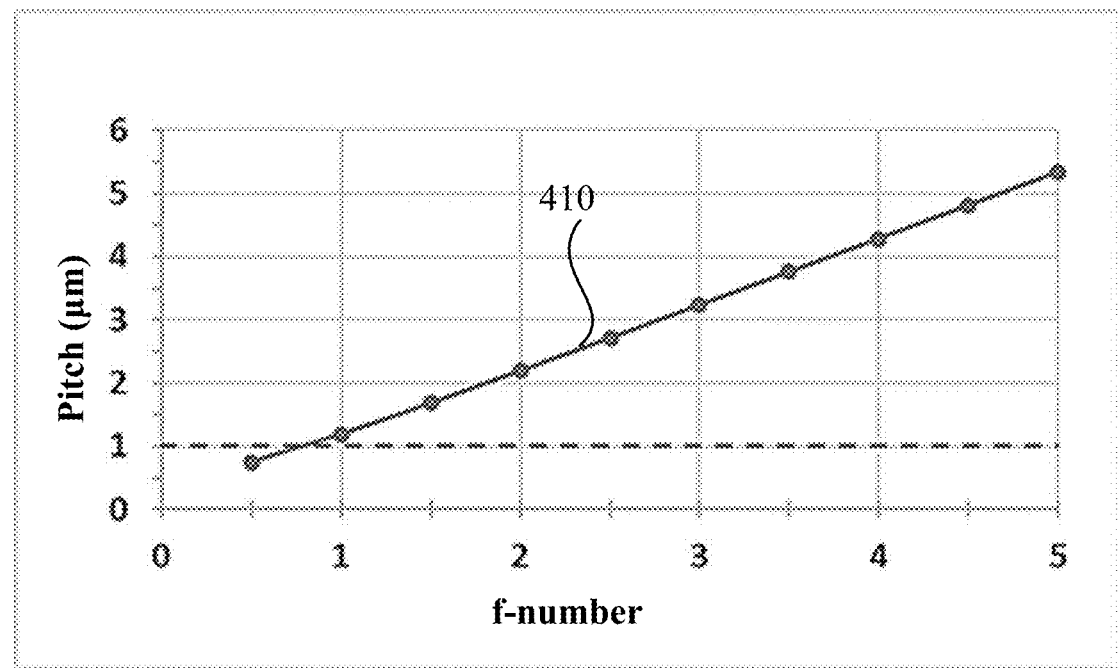
FIG. 4A illustrates simulation results showing a relationship between an f-number of a transmissive PVH ("T-PVH") lens and an in-plane pitch at a lens periphery of the T-PVH lens, according to an embodiment of the present disclosure.

FIG. 4A illustrates simulation results showing a relationship between an f-number of a transmissive PVH ("T-PVH") lens and an in-plane pitch at a lens periphery of the T-PVH lens, according to an embodiment of the present disclosure. The f-number is a dimensionless number that is a quantitative measure of lens speed. The T-PVH lens may be any embodiment of the T-PVH lenses included in apochromatic PVH lenses disclosed herein, such as the T-PVH lens 201, 203, or 205 shown in FIG. 2B or FIG. 2C, or the T-PVH lens 301, 303, or 305 shown in FIG. 3B or FIG. 3C. As shown in FIG. 4A, the horizontal axis represents the f-number of the T-PVH lens, and the vertical axis represents the in-plane pitch (unit: μm) at a lens periphery (or periphery region) of the T-PVH lens. For example, when the T-PVH lens has a circular aperture and the diameter of the aperture is D, the lens center is presumed to be at a position of 0, and the lens periphery is presumed to be at or in proximity to a position of D/2 (in some embodiments, the lens periphery may be at or in proximity to a position of −D/2). The in-plane pitch at the lens periphery of the T-PVH lens may be referred to as the in-plane pitch at or in proximity to the position of D/2. Curve 410 shows the f-number of the T-PVH lens when the in-plane pitch at the lens periphery of the T-PVH lens has different values. Curve 410 shows that the f-number of the T-PVH lens is substantially proportional to the in-plane pitch at the lens periphery of the T-PVH lens. As the in-plane pitch at the lens periphery of the T-PVH lens decreases (or increases), the f-number of the T-PVH lens decreases (or increases). For example, when the in-plane pitch at the periphery of the T-PVH lens is about 0.7 μm, 1.7 μm, 2.2 μm, 3.2 μm, 4.2 μm, 4.8 μm, and 5.3 μm, the f-number of the T-PVH lens is about 0.5, 1.0, 1.5, 2.0, 2.5, 3.0, 3.5, 4.0, 4.5, and 5, respectively. A smaller f-number means faster lens speed. As the in-plane pitch at the lens periphery of the T-PVH lens decreases, the f-number of the T-PVH lens decreases, and the lens speed of the T-PVH lens increases.

Figure 4B:
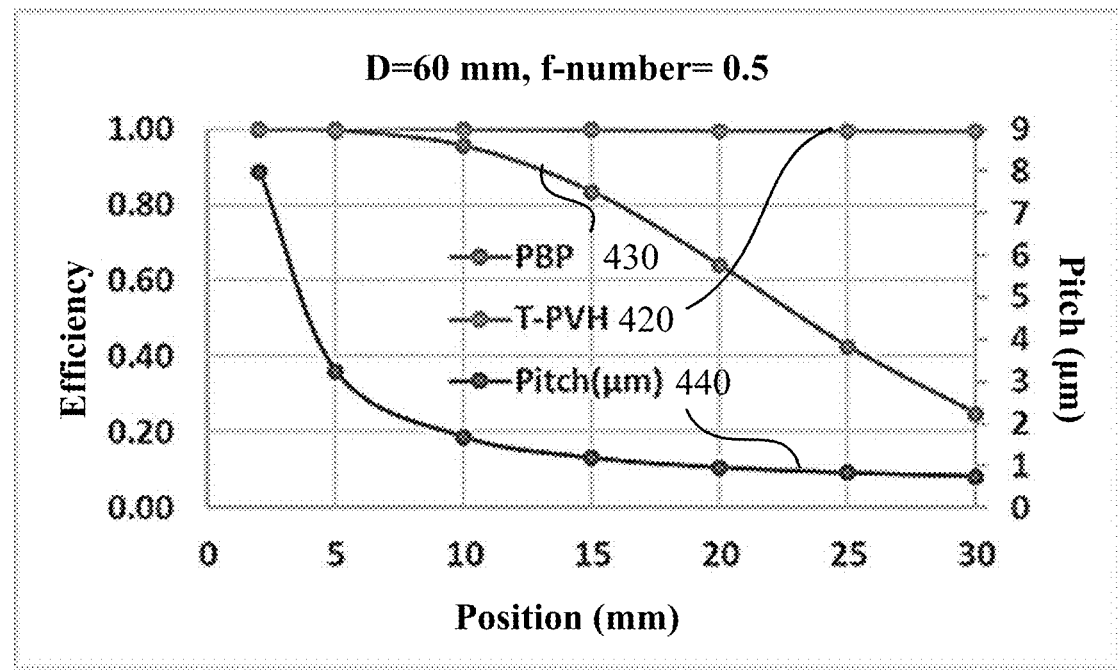
FIG. 4B illustrates simulation results showing a relationship between efficiencies, pitches, and positions of a T-PVH lens and a Pancharatnam-Berry phase ("PBP") lens, according to an embodiment of the present disclosure.

FIG. 4B illustrates simulation results showing a relationship between efficiencies, pitches, and positions of a T-PVH lens and a PBP lens, according to embodiment of the present disclosure. The T-PVH lens may be any embodiment of the T-PVH lenses included in apochromatic PVH lenses disclosed herein, such as the T-PVH lens 201, 203, or 205 shown in FIG. 2B or FIG. 2C, or the T-PVH lens 301, 303, or 305 shown in FIG. 3B or FIG. 3C. As shown in FIG. 4A, the horizontal axis represents the position (unit: mm) at the lens aperture of the T-PVH lens or the PBP lens, the left vertical axis represents the lens efficiency of the T-PVH lens or the PBP lens, and the right vertical axis represents the in-plane pitch (unit: μm) of the T-PVH lens or the PBP lens. In the simulation, the T-PVH lens and the PBP lens have the same aperture size and the same f-number. The diameter D of the aperture is about 60 mm, and the f-number is about 0.5. The lens center is presumed to have a horizontal coordinate value of 0 (unit: mm), and the lens periphery is presumed to have a horizontal coordinate value of 30 (unit: mm). The lens efficiency at a specific position at the lens aperture of the T-PVH lens and the PBP lens is calculated as a ratio between an output light intensity and an input light intensity at the specific position at the lens aperture. The T-PVH lens modulates a circularly polarized light via Bragg diffraction, the lens efficiency of the T-PVH lens may also be considered as the diffraction efficiency of the T-PVH lens. The lens efficiency is monochromatic efficiency, e.g., for red, green, or blue color channel.

Both of the T-PVH lens and the PBP lens may have the same in-plane orientation pattern, e.g., similar to that shown in FIGS. 1C and 1D. Curve 440 shows the in-plane pitches at different positions at the lens aperture of the T-PVH lens or the PBP lens. The in-plane pitch decreases from the central region to the periphery region of the T-PVH lens or the PBP lens. The in-plane pitch of the T-PVH lens or the PBP lens is the largest at the central region (e.g., 8 μm), and is the smallest at the periphery region (e.g., about 0.8 μm).

Curve 430 shows the lens efficiency at different positions at the lens aperture of the PBP lens. The curve 430 shows that the lens efficiency of the PBP lens decreases from the central region to the periphery region. The lens efficiency is the largest at the central region (e.g., about 100%), and is the smallest at the periphery region (e.g., about 20%). The lens efficiency of the PBP lens significantly decreases at the periphery region, resulting in a significant decrease of the light intensity for lights output from the PBP lens at the periphery region.

Curve 420 shows the lens efficiency at different positions at the lens aperture of the T-PVH lens. The curve 420 shows that the lens efficiency of the T-PVH lens is substantially uniform from the central region to the periphery region. Curve 420 shows the lens efficiency of the T-PVH lens is at 100% from the central region to the periphery region, resulting in a substantially uniform distribution of high light intensity across the lens aperture. Accordingly, the disclosed apochromatic PVH lens (e.g., the apochromatic PVH lens 230 shown in FIG. 2B, the apochromatic PVH lens 250 shown in FIG. 2C, the apochromatic PVH lens 330 shown in FIG. 3B, or the apochromatic PVH lens 350 shown in FIG. 3C), which includes a plurality of T-PVH lenses, may also exhibit a substantially uniform apochromatic efficiency (e.g. for red, green, and blue color channels) from the central region to the periphery region of the apochromatic PVH lens, with a superfast lens speed (f-number≤0.5). The apochromatic efficiency may be substantially high, e.g., greater than or equal to 95%. When the disclosed apochromatic PVH lens is implemented as an imaging device, images generated by the disclosed apochromatic PVH lens may have a high and uniform brightness, and a high image resolution.

The curves 420 and 430 show the lens efficiencies at different positions at the lens aperture of the T-PVH lens and the PBP lens, respectively. The curves 420 and 430 may also be used to evaluate the grating efficiencies (or the diffraction efficiencies) of a T-PVH grating and a PBP grating, respectively. The T-PVH grating may be any embodiment of the T-PVH gratings included in the apochromatic PVH beam deflector disclosed herein, such as the T-PVH grating 201, 203, or 205 shown in FIG. 2A, or the T-PVH grating 301, 303, or 305 shown in FIG. 3A. The grating efficiency (or the diffraction efficiency) of the PBP grating may vary as the in-plane pitch of the PBP grating varies. For example, the grating efficiency (or the diffraction efficiency) of the PBP grating may decrease as the in-plane pitch of the PBP grating increases. The grating efficiency (or the diffraction efficiency) of the PBP grating may decrease significantly when the in-plane pitch of the PBP grating is substantially small.

The grating efficiency (or the diffraction efficiency) of the PVH grating may remain substantially the same as the in-plane pitch of the PVH grating varies. For example, the grating efficiency (or the diffraction efficiency) of the PVH grating may be substantially unchanged as the in-plane pitch of the PVH grating increases. In addition, the grating efficiency (or the diffraction efficiency) of the PVH grating may be high, e.g., greater than or equal to 95%. Accordingly, the disclosed apochromatic PVH beam deflector (e.g., the apochromatic PVH beam deflector 200 shown in FIG. 2A, or the apochromatic PVH beam deflector 300 shown in FIG. 3A), which includes a plurality of T-PVH gratings, may also exhibit a substantially high apochromatic efficiency (e.g., for red, green, and blue color channels), as the in-plane pitch of the PVH grating varies. For example, the apochromatic efficiency of the disclosed apochromatic PVH beam deflector may be greater than or equal to 95%.

Referring to FIGS. 2A-3C, the compensation plates 207, 209, and 211 shown in FIG. 2C and FIG. 3C may be compensation plates of a first type. In some embodiments, the apochromatic PVH devices disclosed herein may include one or more compensation plates of a second type alternately arranged with the T-PVH elements 201, 203, and 205 (or 301, 303, and 305). In some embodiments, the one or more compensation plates of the second type may include one or more A-plates configured to compensation for a polarization deviation of a light transmitted through (or output from) a preceding T-PVH element 201, 203, or 205 (or 301, 303, or 305). For example, in some embodiments, for a circularly polarized input light of a predetermined handedness, a light output from the preceding T-PVH element 201, 203, or 205 (or 301, 303, or 305) may have a non-circular polarization, e.g., an elliptical polarization. When such a light is directly incident onto a subsequent T-PVH element 201, 203, or 205 (or 301, 303, or 305), a diffraction efficiency of the subsequent T-PVH element 201, 203, or 205 (or 301, 303, or 305) in a target diffract direction may be decreased. The one or more compensation plates of the second type may be configured to change a polarization of the light output from the preceding T-PVH element 201, 203, or 205 (or 301, 303, or 305) to a circular polarization with the predetermined handedness, before the light is incident onto the subsequent T-PVH element 201, 203, or 205 (or 301, 303, or 305). Thus, the diffraction efficiency of the subsequent T-PVH element 201, 203, or 205 (or 301, 303, or 305) in the target diffract direction may be increased.

Referring to FIGS. 2A-3C, the apochromatic PVH devices disclosed herein include apochromatic PVH beam deflectors and apochromatic PVH lenses, which are for illustrative purposes. Any suitable apochromatic PVH devices may also be configured, following the same design principles for the apochromatic PVH beam deflectors and apochromatic PVH lenses disclosed herein, such as an apochromatic off-axis PVH lens, an apochromatic cylindrical PVH lens, an apochromatic aspheric PVH lens, an apochromatic freeform PVH lens, etc.

Referring to FIGS. 2A-3C, the apochromatic PVH devices disclosed herein are designed based on three wavelengths: $\lambda_R$=620 nm, $\lambda_G$=530 nm, and $\lambda_B$=465 nm. In such an embodiment, the red color channel may correspond to a wavelength of $\lambda_R$=620 nm, the green color channel may correspond to a wavelength of $\lambda_G$=530 nm, and the blue color channel corresponds to a wavelength of $\lambda_B$=465 nm. In some embodiments, apochromatic PVH devices that operate for any suitable spectral region (e.g., IR spectral region, UV spectral region) and/or that include any suitable number of PVH elements may also be configured, following the same design principles for the apochromatic PVH devices operating for the visible spectral region.

In some embodiments, achromatic PVH devices operating for the visible spectral region may be designed based on two wavelengths: $\lambda_R$=620 nm and $\lambda_B$=465 nm, following the same design principles for the apochromatic PVH devices operating for the visible spectral region. For example, in some embodiments, an achromatic PVH device may include two PVH elements. One PVH element may be configured as a half-wave plate for the red color channel and a full-wave plate for the blue color channel, and the other PVH element may be configured as a half-wave plate for the blue color channel and a full-wave plate for the red color channel, similar to that shown in FIGS. 2A-2C. In some embodiments, an achromatic PVH device may include two PVH elements, and a color-selective waveplate disposed between the two PVH elements, similar to that shown in FIGS. 3A-3C. In some embodiments, an achromatic PVH device may also include one or more compensation plates (e.g., C-plates, O-plates, and/or biaxial plates) configured to enhance the angular performance of the achromatic PVH device. In some embodiments, achromatic PVH devices that operate for any suitable spectral region (e.g., IR spectral region, UV spectral region) and/or that include any suitable number of PVH elements may also be configured, following the same design principles for the achromatic PVH devices operating for the visible spectral region.

The apochromatic PVH devices or components disclosed herein have features of small thickness (about 1 um), high monochromatic and apochromatic efficiency (≥95%), superfast power (f-number≤0.5 for a lens, beam deflection angle≥45° for a beam deflector), light weight, compactness, large aperture, simple fabrication, etc. The apochromatic PVH devices disclosed herein may be implemented in systems or devices for imaging, sensing, communication, biomedical applications, etc. Beam steering devices based on the disclosed apochromatic PVH devices may be implemented in various systems for augmented reality ("AR"), virtual reality ("VR"), and/or mixed reality ("MR") applications, e.g., near-eye displays ("NEDs"), head-up displays ("HUDs"), head-mounted displays ("HMDs"), smart phones, laptops, televisions, vehicles, etc. For example, beam steering devices based on the disclosed apochromatic PVH devices may be implemented in displays and optical modules to enable pupil steered AR, VR, and/or MR display systems, such as holographic near eye displays, retinal projection eyewear, and wedged waveguide displays. Pupil steered AR, VR, and/or MR display systems have features such as compactness, large field of views ("FOVs"), high system efficiencies, and small eye-boxes. Beam steering devices based on the disclosed polarization selective devices may be implemented in the pupil steered AR, VR, and/or MR display systems to enlarge the eye-box spatially and/or temporally. In some embodiments, beam steering devices based on the disclosed apochromatic PVH devices or components may be implemented in AR, VR, and/or MR sensing modules to detect objects in a wide angular range to enable other functions. In some embodiments, beam steering devices based on the disclosed apochromatic PVH devices or components may be implemented in AR, VR, and/or MR sensing modules to extend the FOV (or detecting range) of the sensors in space constrained optical systems, increase detecting resolution or accuracy of the sensors, and/or reduce the signal processing time. Beam steering devices based on the disclosed apochromatic PVH devices or components may also be used in Light Detection and Ranging ("Lidar") systems in autonomous vehicles. Beam steering devices based on the disclosed apochromatic PVH devices or components may also be used in optical communications, e.g., to provide fast speeds (e.g., speeds at the level of Gigabyte/second) and long ranges (e.g., ranges at kilometer levels). Beam steering devices based on the disclosed apochromatic PVH devices or components may also be implemented in microwave communications, 3D imaging and sensing (e.g., Lidar), lithography, and 3D printing, etc.

Imaging devices based on the disclosed apochromatic PVH devices may be implemented in various systems for AR, VR, and/or MR applications, enabling light-weight and ergonomic designs for AR, VR, and/or MR devices. For example, imaging devices based on the disclosed apochromatic PVH devices may be implemented in displays and optical modules to enable smart glasses for AR, VR, and/or MR applications, compact illumination optics for projectors, light-field displays. Imaging devices based on the disclosed apochromatic PVH devices may replace conventional objective lenses having a high numerical aperture in microscopes. Imaging devices based on the disclosed apochromatic PVH devices may be implemented light source assemblies to provide a polarized structured illumination to a sample, for identifying various features of the sample. Imaging devices based on the disclosed apochromatic PVH devices may enable polarization patterned illumination systems that add a new degree for sample analysis.

Figure 5A:
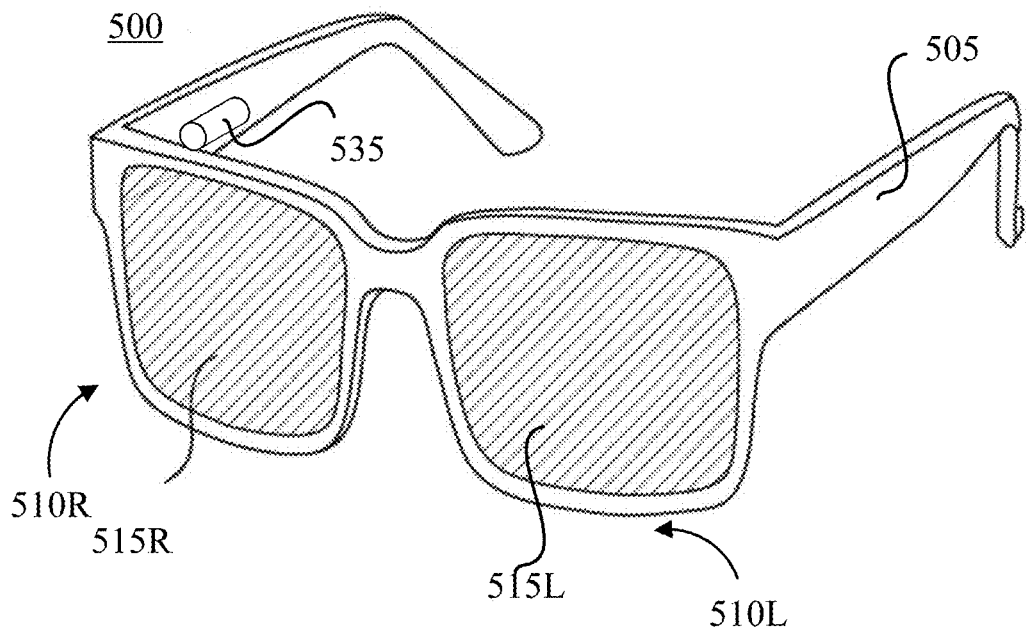
FIG. 5A illustrates a schematic diagram of a near-eye display ("NED"), according to an embodiment of the present disclosure.
Figure 5B:
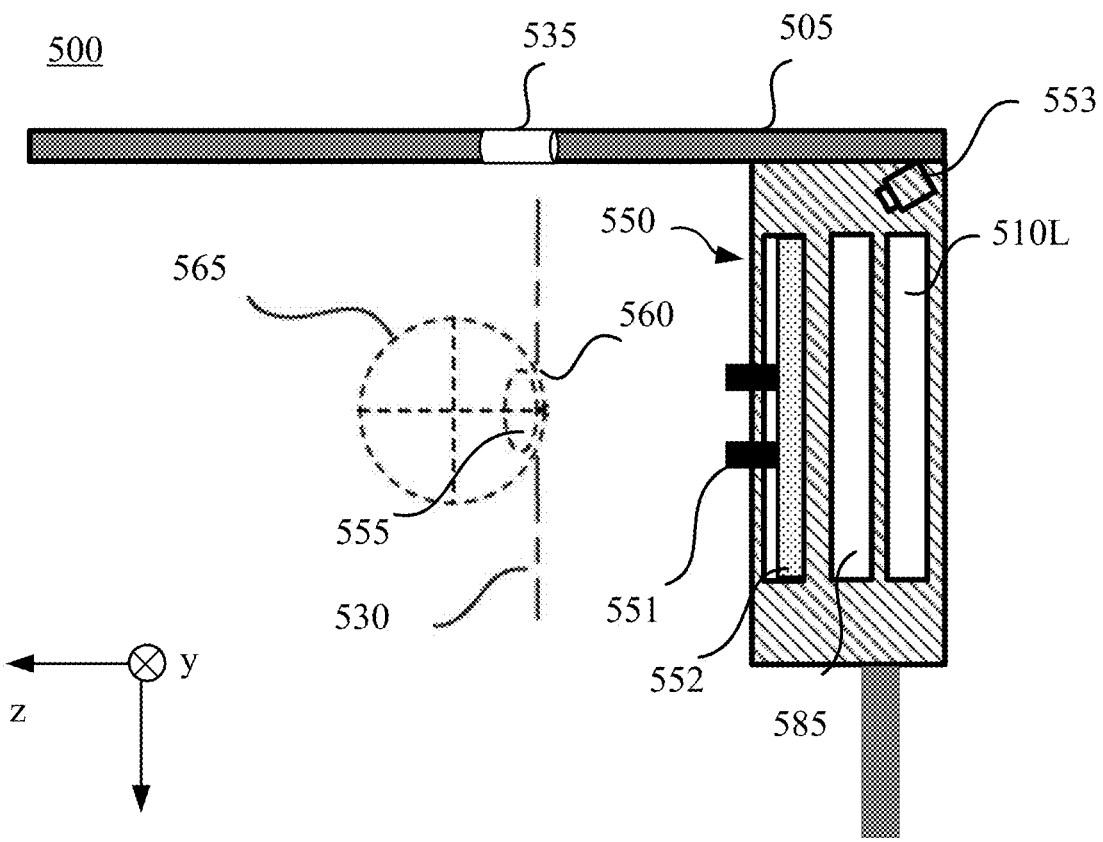
FIG. 5B illustrates a schematic cross sectional view of half of the NED shown in FIG. 5A, according to an embodiment of the present disclosure.

FIG. 5A illustrates a schematic diagram of a near-eye display ("NED") 500 according to an embodiment of the disclosure. FIG. 5B is a cross-sectional view of half of the NED 500 shown in FIG. 5A according to an embodiment of the disclosure. For purposes of illustration, FIG. 5B shows the cross-sectional view associated with a left-eye display system 510L. The NED 500 may include a controller (not shown). The NED 500 may include a frame 505 configured to mount to a user's head. The frame 505 is merely an example structure to which various components of the NED 500 may be mounted. Other suitable fixtures may be used in place of or in combination with the frame 505. The NED 500 may include right-eye and left-eye display systems 510R and 510L mounted to the frame 505. The NED 500 may function as a VR device, an AR device, an MR device, or any combination thereof. In some embodiments, when the NED 500 functions as an AR or an MR device, the right-eye and left-eye display systems 510R and 510L may be entirely or partially transparent from the perspective of the user, which may provide the user with a view of a surrounding real-world environment. In some embodiments, when the NED 500 functions as a VR device, the right-eye and left-eye display systems 510R and 510L may be opaque, such that the user may be immersed in the VR imagery based on computer-generated images.

The right-eye and left-eye display systems 510R and 510L may include image display components configured to project computer-generated virtual images into left and right display windows 515L and 515R in a field of view ("FOV"). The right-eye and left-eye display systems 510R and 510L may be any suitable display systems. For illustrative purposes, FIG. 5A shows that the right-eye and left-eye display systems 510R and 510L may include a projector 535 coupled to the frame 505. The projector 535 may generate an image light representing a virtual image. In some embodiments, the right-eye and left-eye display systems 510R and 510L may include one or more disclosed apochromatic PVH devices or components. As shown in FIG. 5B, the NED 500 may also include a lens system (or viewing optical system) 585 and an object tracking system 550 (e.g., eye tracking system and/or face tracking system). The lens system 585 may be disposed between the object tracking system 550 and the left-eye display system 510L. The lens system 585 may be configured to guide the image light output from the left-eye display system 510L to an exit pupil 560. The exit pupil 560 may be a location where an eye pupil 555 of an eye 565 of the user is positioned in an eye-box region 530 of the left-eye display system 510L. In some embodiments, the lens system 585 may be configured to correct aberrations in the image light output from the left-eye display system 510L, magnify the image light output from the left-eye display system 510L, or perform another type of optical adjustment to the image light output from the left-eye display system 510L. The lens system 585 may include multiple optical elements, such as lenses, waveplates, reflectors, etc. In some embodiments, the lens system 585 may include a pancake lens configured to fold the optical path, thereby reducing the back focal distance in the NED 500. In some embodiments, the lens system 585 may include one or more disclosed apochromatic PVH devices or components. The object tracking system 550 may include an IR light source 551 configured to illuminate the eye 565 and/or the face, a deflecting element 552 configured to deflect the IR light reflected by the eye 565, and an optical sensor 553 configured to receive the IR light deflected by the deflecting element 552 and generate a tracking signal. In some embodiments, the object tracking system 550 may include one or more disclosed apochromatic PVH devices or components.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a first polarization hologram element;
a second polarization hologram element stacked with the first polarization hologram element; and
a color-selective waveplate disposed between the first polarization hologram element and the second polarization hologram element, and configured to operate as a half-wave plate for a first light having a first wavelength and as a full-wave plate for a second light having a second wavelength,
wherein the first polarization hologram element is configured to forwardly diffract the first light and the second light both having a first handedness toward the color-selective waveplate as a third light and a fourth light both having a second handedness, respectively, and provide a first optical power to the first light having the first handedness, and a second optical power to the second light having the first handedness, wherein the first optical power and the second optical power have the same sign, and wherein the second handedness is opposite to the first handedness,
wherein the color-selective waveplate is configured to transmit the third light having the second handedness as a fifth light having the first handedness, and transmit the fourth light having the second handedness as a sixth light having the second handedness, and
wherein the second polarization hologram element is configured to forwardly diffract the fifth light having the first handedness as a seventh light having the second handedness and the first wavelength, and provide a third optical power to the fifth light having the first handedness, and transmit the sixth light having the second handedness as an eighth light having the second handedness and the second wavelength, the third optical power has a sign that is opposite to the same sign of the first optical power and the second optical power.

2. The device of claim 1, wherein the first polarization hologram element and the second polarization hologram element and the color-selective waveplate together are configured to deflect the first light and the second light each having the first handedness in a same deflecting angle.

3. The device of claim 1, wherein the first polarization hologram element and the second polarization hologram element and the color-selective waveplate together are configured to focus the first light and the second light each having the first handedness to a same focal point.

4. The device of claim 1, wherein the first polarization hologram element and the second polarization hologram element are transmissive polarization volume hologram elements.

5. The device of claim 1, wherein
the color-selective waveplate is a first color-selective waveplate, and the device further comprises a third polarization hologram element, and a second color-selective waveplate disposed between the second polarization hologram element and the third polarization hologram element.

6. The device of claim 5,
wherein the second color-selective waveplate is configured to operate as a full-wave plate to transmit the seventh light having the second handedness as a ninth light having the second handedness, and operate as a half-wave plate to transmit the eighth light having the second handedness as a tenth light having the first handedness,
wherein the third polarization hologram element is configured to forwardly diffract the tenth light having the first handedness and provide a fourth optical power to the tenth light having the first handedness, and transmit the ninth light having the second handedness, and
wherein the fourth optical power has a sign that is opposite to the same sign of the first optical power and the second optical power.

7. The device of claim 1, further comprising at least one compensation plate stacked with the first polarization hologram element and the second polarization hologram element and the color-selective waveplate.

8. The device of claim 7, wherein the at least one compensation plate is a C-plate, an O-plate, or a biaxial plate.

* * * * *